US012506370B2

(12) United States Patent
Nakano

(10) Patent No.: US 12,506,370 B2
(45) Date of Patent: Dec. 23, 2025

(54) MOTOR FORMED WITH A DISTRIBUTED WINDING COIL

(71) Applicant: MINEBEA MITSUMI Inc., Nagano (JP)

(72) Inventor: Tomoaki Nakano, Kitasaku (JP)

(73) Assignee: MINEBEA MITSUMI Inc., Nagano (JP)

( * ) Notice: Subject to any disclaimer, the term of this patent is extended or adjusted under 35 U.S.C. 154(b) by 198 days.

(21) Appl. No.: 18/552,304

(22) PCT Filed: Mar. 29, 2022

(86) PCT No.: PCT/JP2022/015462
§ 371 (c)(1),
(2) Date: Sep. 25, 2023

(87) PCT Pub. No.: WO2022/210715
PCT Pub. Date: Oct. 6, 2022

(65) Prior Publication Data
US 2024/0171018 A1    May 23, 2024

(30) Foreign Application Priority Data

Mar. 31, 2021  (JP) ................................. 2021-059460

(51) Int. Cl.
*H02K 1/14* (2006.01)
*H02K 1/18* (2006.01)
*H02K 3/32* (2006.01)
(52) U.S. Cl.
CPC ............... *H02K 1/146* (2013.01); *H02K 1/18* (2013.01); *H02K 3/32* (2013.01)

(58) Field of Classification Search
CPC ............. H02K 1/18; H02K 1/146; H02K 3/32
(Continued)

(56) References Cited

U.S. PATENT DOCUMENTS 11,942,849 B2*  3/2024  Lim ....................... H02K 1/146
2020/0373794 A1* 11/2020  Kimura ..................... H02K 3/32
(Continued)

FOREIGN PATENT DOCUMENTS

JP  06-261475 A   9/1994
JP  H08-182273 A  7/1996
(Continued)

OTHER PUBLICATIONS

English translation of Written Opinion for corresponding International Application No. PCT/JP2022/015462 mailed Jun. 21, 2022.
(Continued)

*Primary Examiner* — Rashad H Johnson
(74) *Attorney, Agent, or Firm* — Chrisman Gallo Tochtrop LLP

(57) ABSTRACT

A motor includes: a shaft; a rotor; a first stator; and a second stator. The first stator includes: a plurality of first yoke parts; a plurality of first magnetic pole units; a coupling part coupling the plurality of first yoke parts in a circumferential direction; and a gap formed between the plurality of the first magnetic pole units adjacent in a circumferential direction. The second stator includes: a second yoke part; and a second magnetic pole unit, respectively. The second stator is disposed at the gap.

6 Claims, 22 Drawing Sheets

(58) Field of Classification Search
USPC .................................................. 310/254.1
See application file for complete search history.

(56) References Cited

U.S. PATENT DOCUMENTS

| | | | |
|---|---|---|---|
| 2023/0387775 A1* | 11/2023 | Morimoto | H02K 49/102 |
| 2025/0101981 A1* | 3/2025 | Takada | F04C 2/102 |

FOREIGN PATENT DOCUMENTS

| | | | |
|---|---|---|---|
| JP | 2007-274808 A | 10/2007 |
| JP | 2010-246342 A | 10/2010 |
| JP | 2017-169419 A | 9/2017 |

OTHER PUBLICATIONS

International Search Report for corresponding International Application No. PCT/JP2022/015462 mailed Jun. 21, 2022.
Written Opinion for corresponding International Application No. PCT/JP2022/015462 dated Jun. 21, 2022.

\* cited by examiner

MOTOR FORMED WITH A DISTRIBUTED WINDING COIL

CROSS-REFERENCE TO RELATED APPLICATIONS

This application is a national stage entry of International Application No. PCT/JP2022/015462 filed on Mar. 29, 2022, which claims the benefit of priority to Japanese Application No. JP2021-059460, filed Mar. 31, 2021, the entire disclosures of which are hereby incorporated herein by reference.

TECHNICAL FIELD

The present invention relates to a motor.

BACKGROUND ART

In a rotary electric machine such as a motor, a distributed winding technique forming a coil by winding a wire around a plurality of teeth (magnetic pole unit) is known.

CITATION LIST

Patent Literature

Patent Document 1: JP 2007-274808 A
Patent Document 2: JP 2010-246342 A
Patent Document 3: JP 2017-169419 A

SUMMARY OF INVENTION

Technical Problem

For example, when the number of magnetic pole units is increased to receive magnetic flux from a magnet, some of the magnetic pole units may no longer be coiled at a distributed winding motor. In this case, there is a need for a motor to be formed more easily when a coil is disposed in a distributed winding manner, for example, when the magnetic pole unit with the coil not wound around may interfere upon inserting the nozzle for winding the coil or the wound bobbin coil.

In one side view, an object is to provide a motor easily formed with distributed winding coil.

Solution to Problem

In one aspect, a motor includes: a shaft; a rotor; a first stator; and a second stator. The first stator includes: a plurality of first yoke parts; a plurality of first magnetic pole units; a coupling part configured to couple the plurality of first yoke parts in a circumferential direction; and a gap formed between the plurality of first magnetic pole units adjacent in a circumferential direction. The second stator includes: a second yoke part: and a second magnetic pole unit. The second stator is disposed at the gap.

According to one aspect, distributed winding coils can be easily formed.

DESCRIPTION OF EMBODIMENTS

Figure 1:
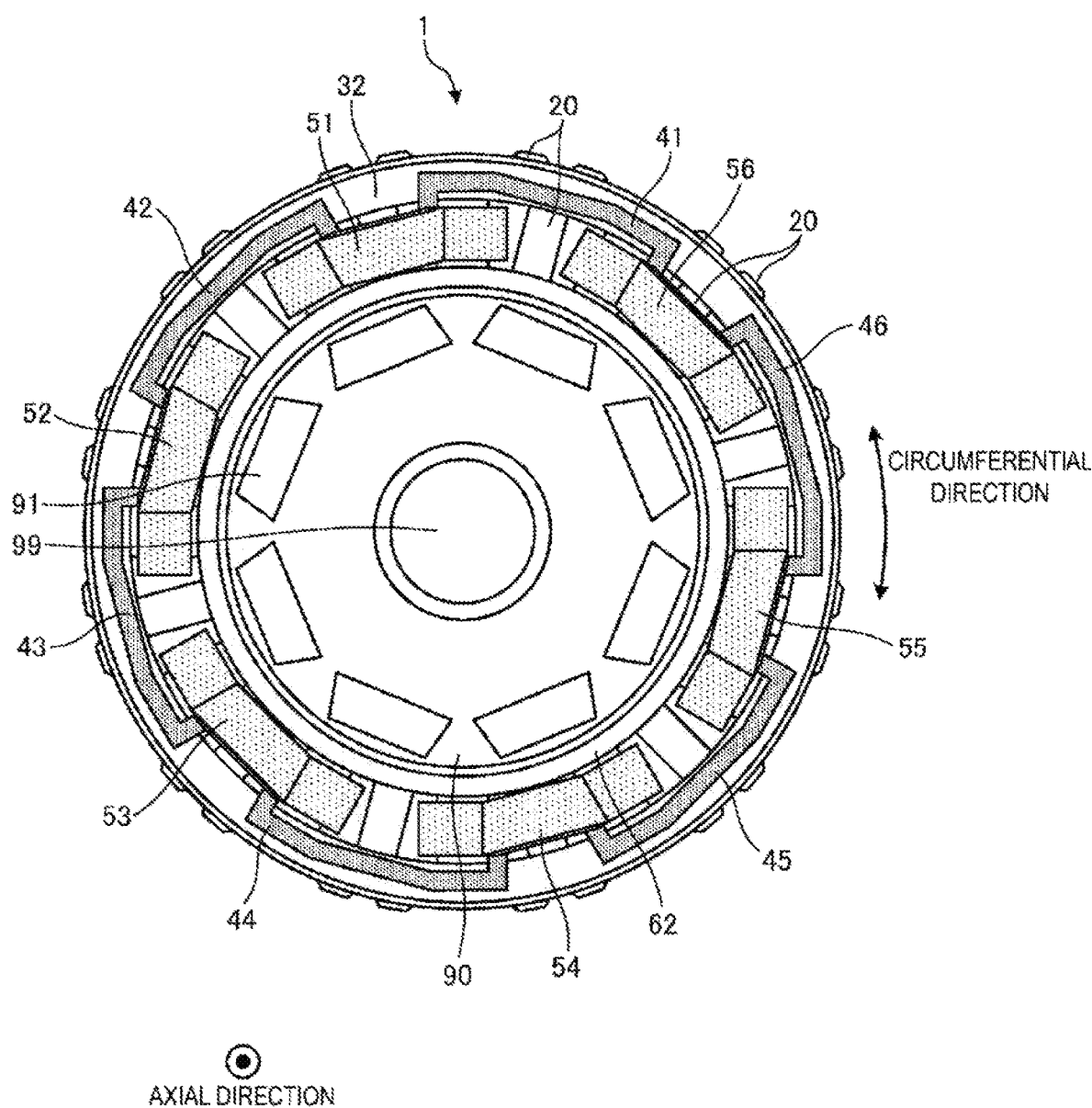
FIG. 1 is a top view illustrating an example of a motor according to an embodiment.

Embodiments of the motor disclosed in the present application will be described in detail below based on the drawings. Note that in the drawings, the dimensional relationship of elements and the ratio of the elements may differ from reality. Among the drawings, parts having mutually different dimensional relationships and proportions may be included. In order to facilitate a description, each drawing may illustrate a coordinate system. In the coordinate system, an extending direction of a shaft 99 to be described below is defined as an axial direction and a rotation direction of a rotor 90 is defined as a circumferential direction.

Embodiment

Figure 2:
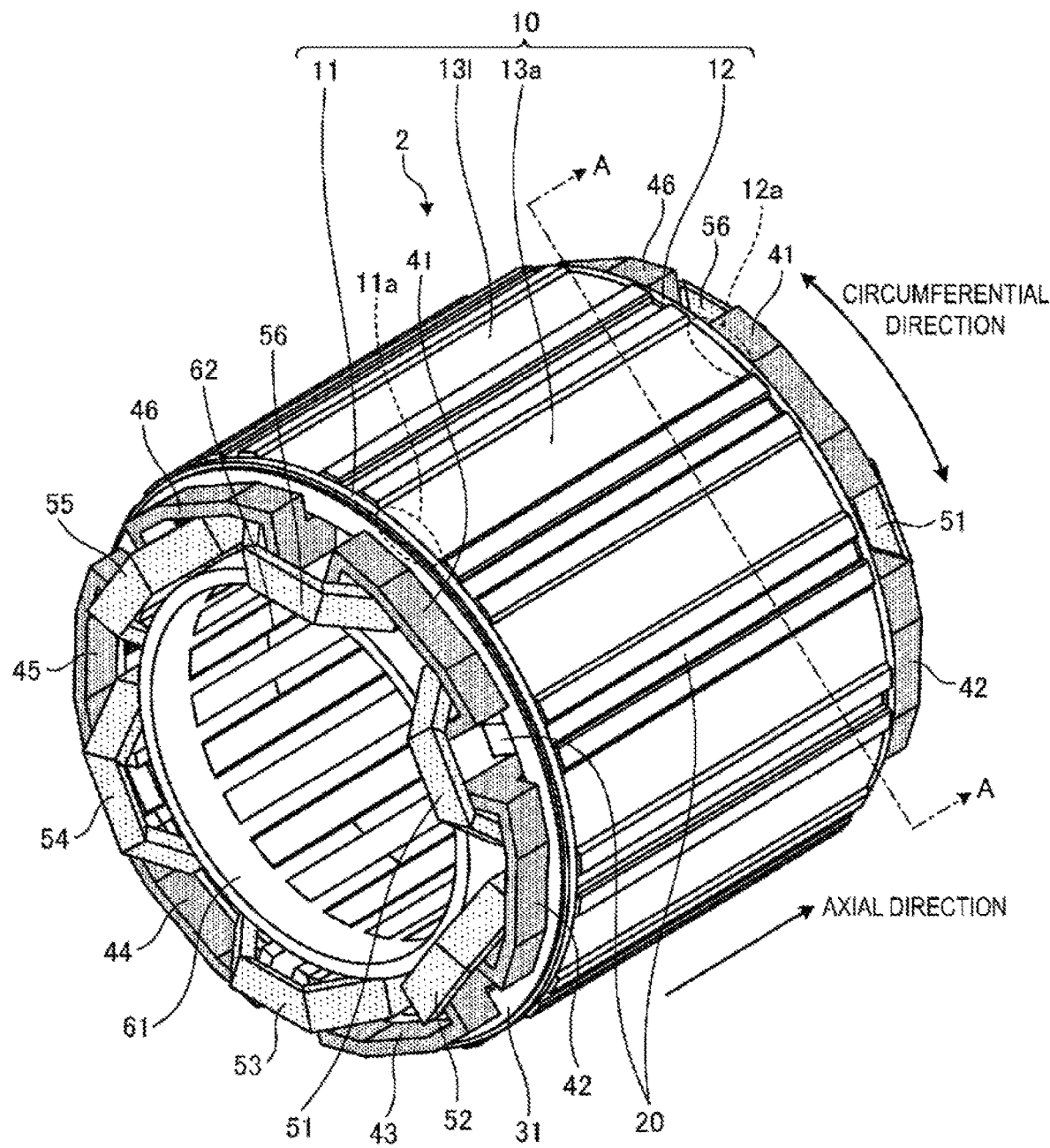
FIG. 2 is a perspective view illustrating an example of a stator according to an embodiment.

FIG. 1 is a top view illustrating an example of a motor according to an embodiment. FIG. 2 is a perspective view illustrating an example of a stator according to an embodiment. A motor 1 illustrated in FIG. 1 includes, for example, a stator 2 illustrated in FIG. 2, the rotor 90, and the shaft 99. The motor 1 described in the embodiment is an inner rotor-type brushless motor. At the motor 1, for example, the rotor 90 with a plurality of magnets 91 as components is disposed, and a rotating shaft 99 is coupled to this rotor 90. Additionally, the motor 1 is accommodated in a frame not illustrated, for example.

As illustrated in FIGS. 1 and 2, the stator 2 according to the embodiment includes a first stator 10, a second stator 20, a pair of insulators 31 and 32 as examples of insulating members, a plurality of first coils 41 to 46, a plurality of second coils 51 to 56, and a pair of stoppers 61 and 62. In the following, a plurality of first coils 41 to 46, when expressed without distinction, may be described as first coils 40. Similarly, in the following, a plurality of second coils 51 to 56, when expressed without distinction, may be described as second coils 50.

According to the embodiment, the first stator 10 includes a pair of coupling parts 11 and 12, twelve first yoke parts 13, and twelve first magnetic pole units 16 described later. In FIGS. 1 and 2, the first magnetic pole units 16 are covered by a pair of insulators 31 and 32, and is not visible.

According to the embodiment, the first coils 40 and the second coils 50 are, for example, bobbin coils composed of prewound copper wire of square wire. The first coils 40 and the second coils 50 are disposed in close proximity to the first stator 10 with the insulators 31 and 32 mounted. Further, according to the embodiment, the first coils 40 and the second coils 50 are distributed winding coils disposed across the plurality of first magnetic pole units 16.

Figure 3:
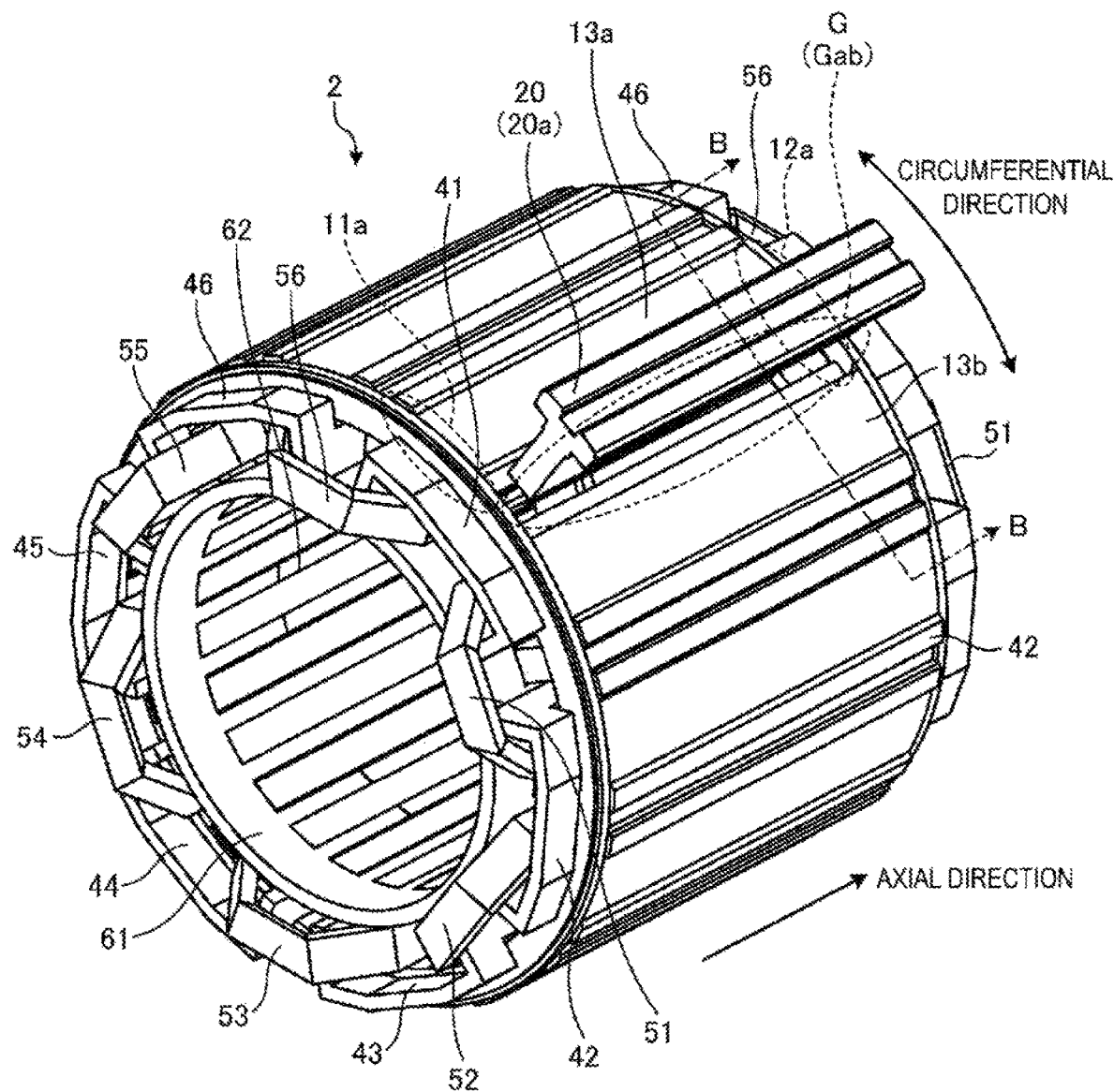
FIG. 3 is a perspective view illustrating an example of mounting a second stator to a first stator according to an embodiment.

In addition, according to the embodiment, the first coil 40 and the second coil 50 are not wound around the second stator 20. The second stator 20 according to the embodiment is mounted after the first coil 40 and the second coil 50 are disposed at the first stator 10, for example. FIG. 3 is a perspective view illustrating an example of mounting the second stator to the first stator according to the embodiment. According to the embodiment, the second stator 20 is mounted from the outside in the radial direction to a gap G formed between two adjacent first magnetic pole units 16. For example, as illustrated in FIG. 3, a second stator 20a is mounted to a gap Gab formed between a first magnetic pole unit 16a and a first magnetic pole unit 16b.

When the second stator 20 is mounted after the first coils 40 and the second coils 50 are disposed as described above, the second stator 20 does not interfere with the placement of the first coils 40 and the second coils 50 at the first stator 10. This improves workability during the placement of distributed winding coils.

Figure 4:
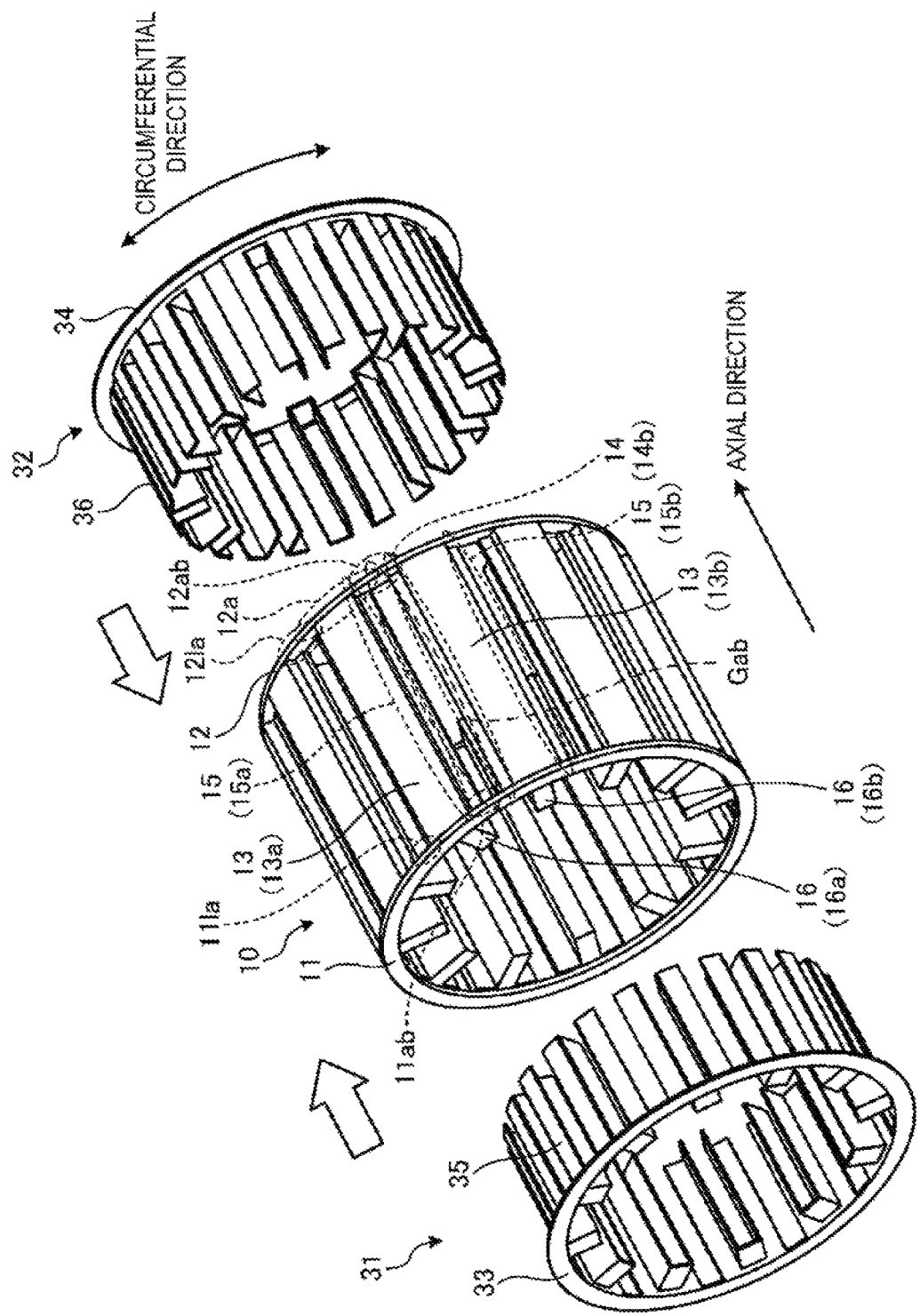
FIG. 4 is an exploded perspective view illustrating an example of a first stator and an insulator according to an embodiment.

According to the embodiment, the pair of insulators 31 and 32 are first mounted at the first stator 10. FIG. 4 is an exploded perspective view illustrating an example of the first stator and the insulators according to the embodiment. According to the embodiment, the coupling parts 11 and 12 are annular members formed of a magnetic body, such as stainless steel or an electromagnetic steel plate. As illustrated in FIG. 4, the coupling parts 11 and 12 have approximately the same shape. The material of the coupling part may be any material as long as the first yoke parts can be coupled and held. The coupling parts 11 and 12 may be provided integrally with the first stator or separately.

The first yoke parts 13 are members formed by, for example, stacking electromagnetic steel plates in the axial direction. As illustrated in FIG. 4, the plurality of first yoke parts 13 are disposed adjacent to each other in the circumferential direction. In the following, the plurality of first yoke parts 13, when expressed with distinction, may be described as the first yoke parts 13a to 13l, respectively.

The end part at the negative axial side of the first yoke part 13 is coupled to the coupling part 11. Similarly, the end part at the positive axial side of the first yoke part 13 is coupled to a coupling part 12. For example, an end part 11a of a first yoke part 13a is coupled to the coupling part 11, and an end part 12a is coupled to the coupling part 12. That is, the twelve first yoke parts 13 are disposed side by side in the circumferential direction by the pair of coupling parts 11 and 12.

The plurality of first magnetic pole units 16 are formed integrally with the first yoke part 13 and are protrusions extending from the inner circumferential surface side of the first yoke part 13 toward inward in the radial direction. In the following, the plurality of first magnetic pole units 16, when expressed with distinction, may be expressed as the first magnetic pole units 16a to 16l, respectively.

Figure 5:
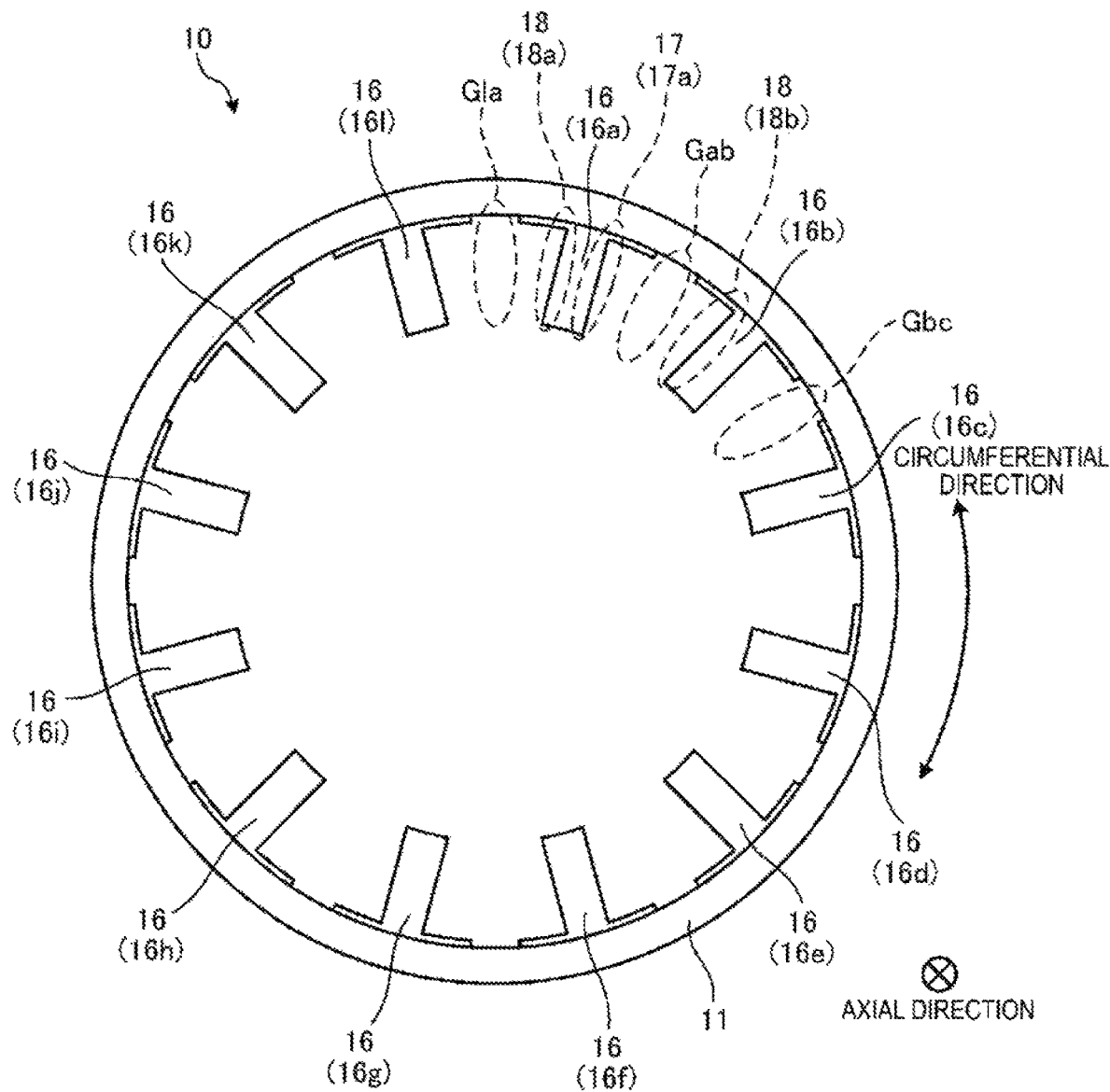
FIG. 5 is a top view illustrating an example of the first stator according to an embodiment.

FIG. 5 is a top view illustrating an example of the first stator according to the embodiment. As illustrated in FIG. 4 and FIG. 5, the first magnetic pole unit 16 according to the embodiment has a shape without an end part protruding in the circumferential direction at the tip side (inside in the radial direction), for example.

As illustrated in FIGS. 4 and 5, the gap G is formed between two first yoke parts 13 adjacent in a circumferential direction. For example, the gap Gab described in FIG. 3 is formed between the first yoke part 13a and a first yoke part 13b, and a gap Gla is formed between a first yoke part 13l and the first yoke part 13a. Both end parts in the axial direction of the gap Gab are sandwiched by portions 11ab and 12ab of the coupling parts 11 and 12, and both end parts in the axial direction of the gap Gla are sandwiched by portions 11la and 12la of the coupling parts 11 and 12.

In addition, as illustrated in FIG. 4, in the outer circumferential direction of each first yoke part 13, recessed parts 14 and 15 are formed in the circumferential direction at both ends and include parts in a radial direction recessed in the circumferential direction. As illustrated in FIG. 4, the end face in the circumferential direction of a recessed part 15a and the end face in the circumferential direction of a recessed part 14b oppose each other across the gap Gab.

Also, as illustrated in FIG. 5, an end face 17 in the circumferential direction of the first magnetic pole unit 16 and an opposite end face 18 in the circumferential direction of the adjacent first magnetic pole unit 16 oppose each other across the gap G. For example, an end face 17a of the first magnetic pole unit 16a and an end face 18b of the first magnetic pole unit 16b oppose each other across the gap Gab.

According to the embodiment, the insulator 31 is mounted to the first stator 10 from the negative side in the axial direction. Similarly, an insulator 32 is mounted to the first stator 10 from the positive side in the axial direction. The insulators 31 and 32 are formed of, for example, resin or the like. As illustrated in FIG. 4, according to the embodiment, the insulator 32 has approximately the same shape as the insulator 31. That is, the first stator 10 with the insulators 31 and 32 according to the embodiment mounted has a nearly symmetrical shape in the axial direction.

As illustrated in FIG. 4, the insulator 31 according to the embodiment includes a coupling part 33 and twelve protrusions 35. The coupling part 33 is an annular member covering the coupling part 11 of the first stator 10 from the negative side in the axial direction. Each protrusion 35 covers each first yoke part 13 of the first stator 10 from the inside in the radial direction. In addition, each protrusion 35 covers the end face 17 and the end face 18 of the first magnetic pole unit 16 from both sides in the circumferential direction. Similarly, the insulator 32 according to the embodiment includes a coupling part 34 and twelve protrusions 36.

Figure 6:
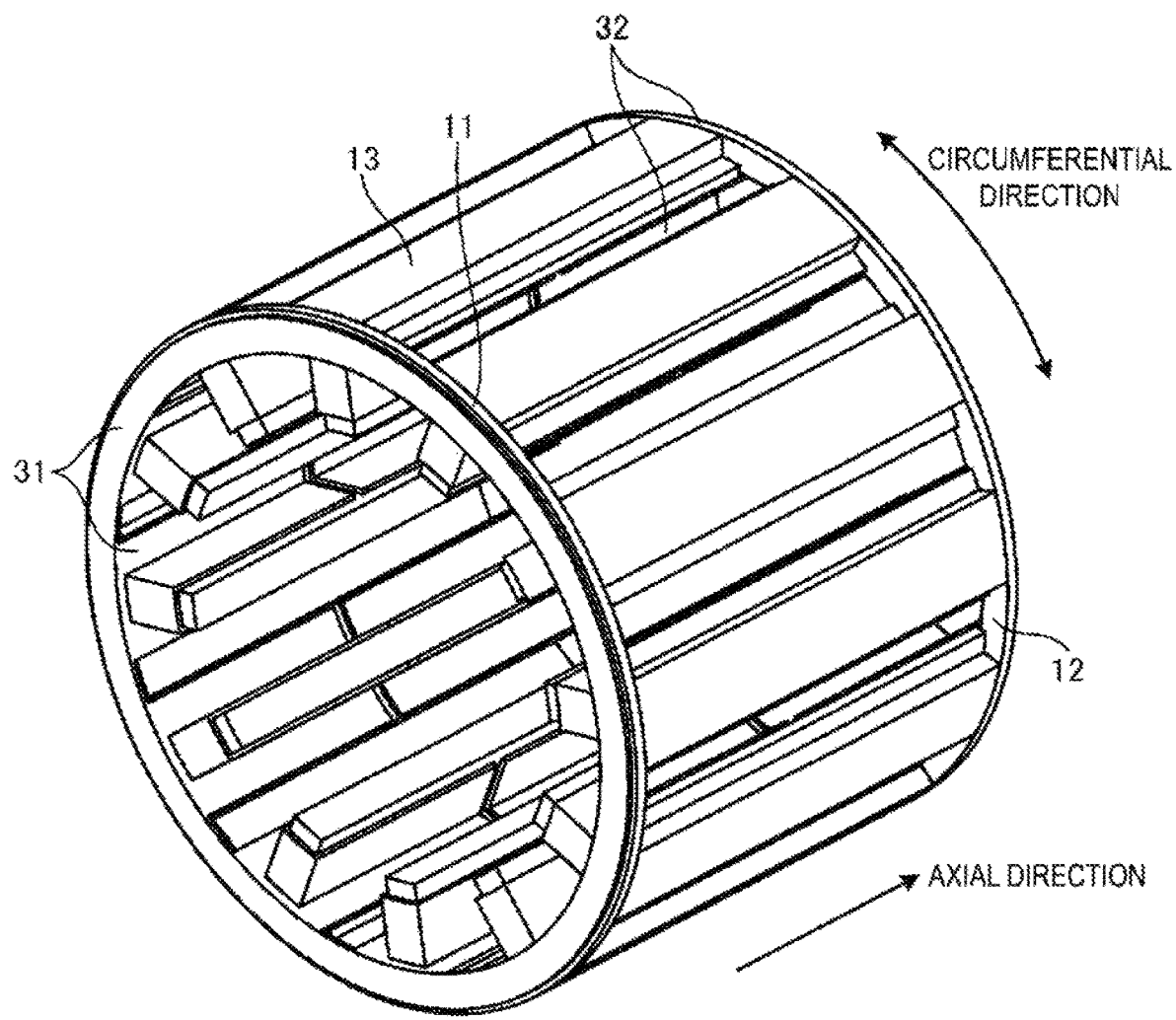
FIG. 6 is a perspective view illustrating an example of the first stator with the insulator attached according to an embodiment.

FIG. 6 is a perspective view illustrating an example of the first stator with insulators attached according to the embodiment. According to the embodiment, the first coils 40 and the second coils 50 are disposed at the first stator 10 with the insulators 31 and 32 as illustrated in FIG. 6 mounted, as illustrated in FIG. 1 and FIG. 2.

Figure 7:
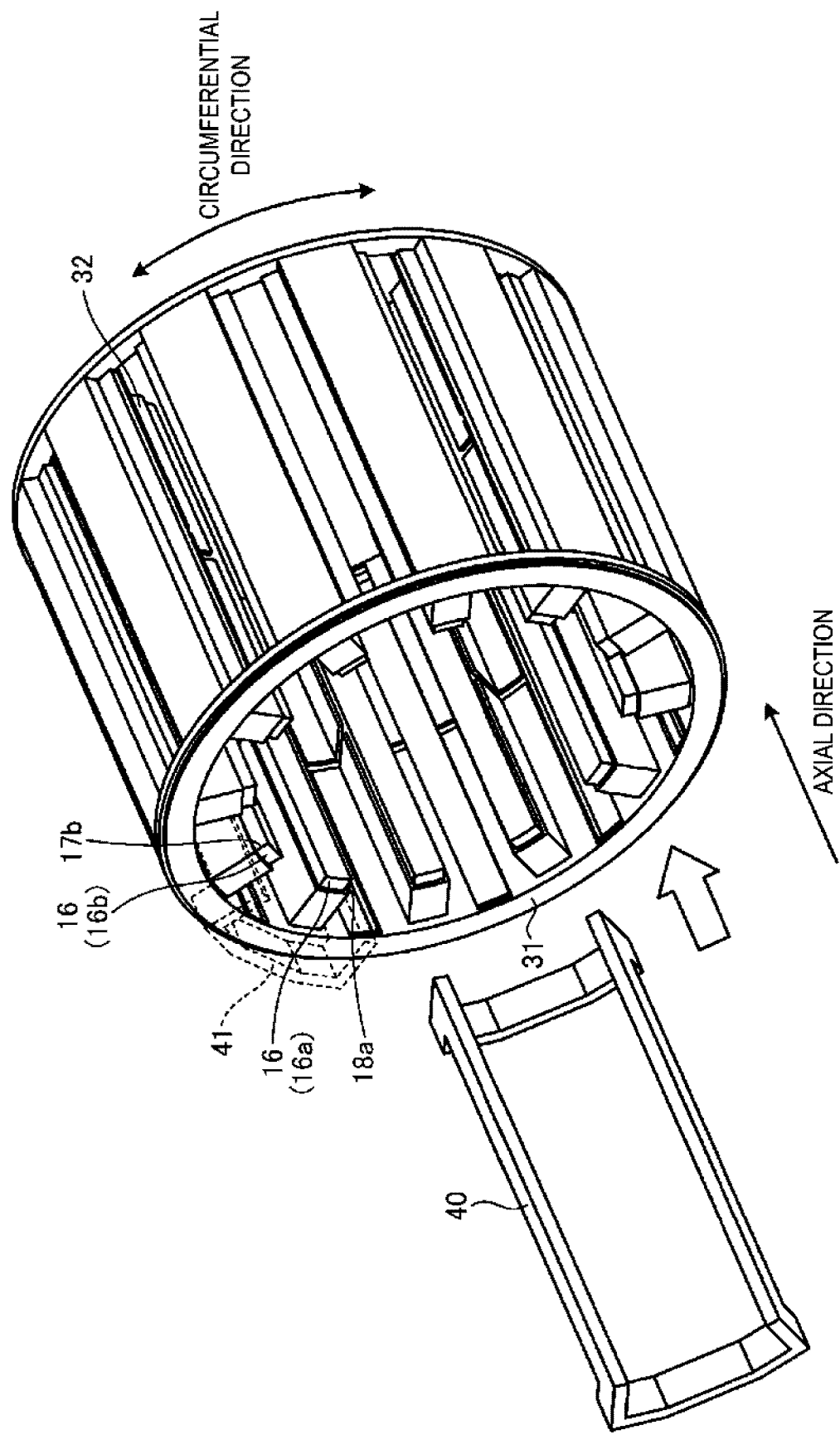
FIG. 7 is a perspective view illustrating an example of attaching a first coil to the first stator according to an embodiment.
Figure 8:
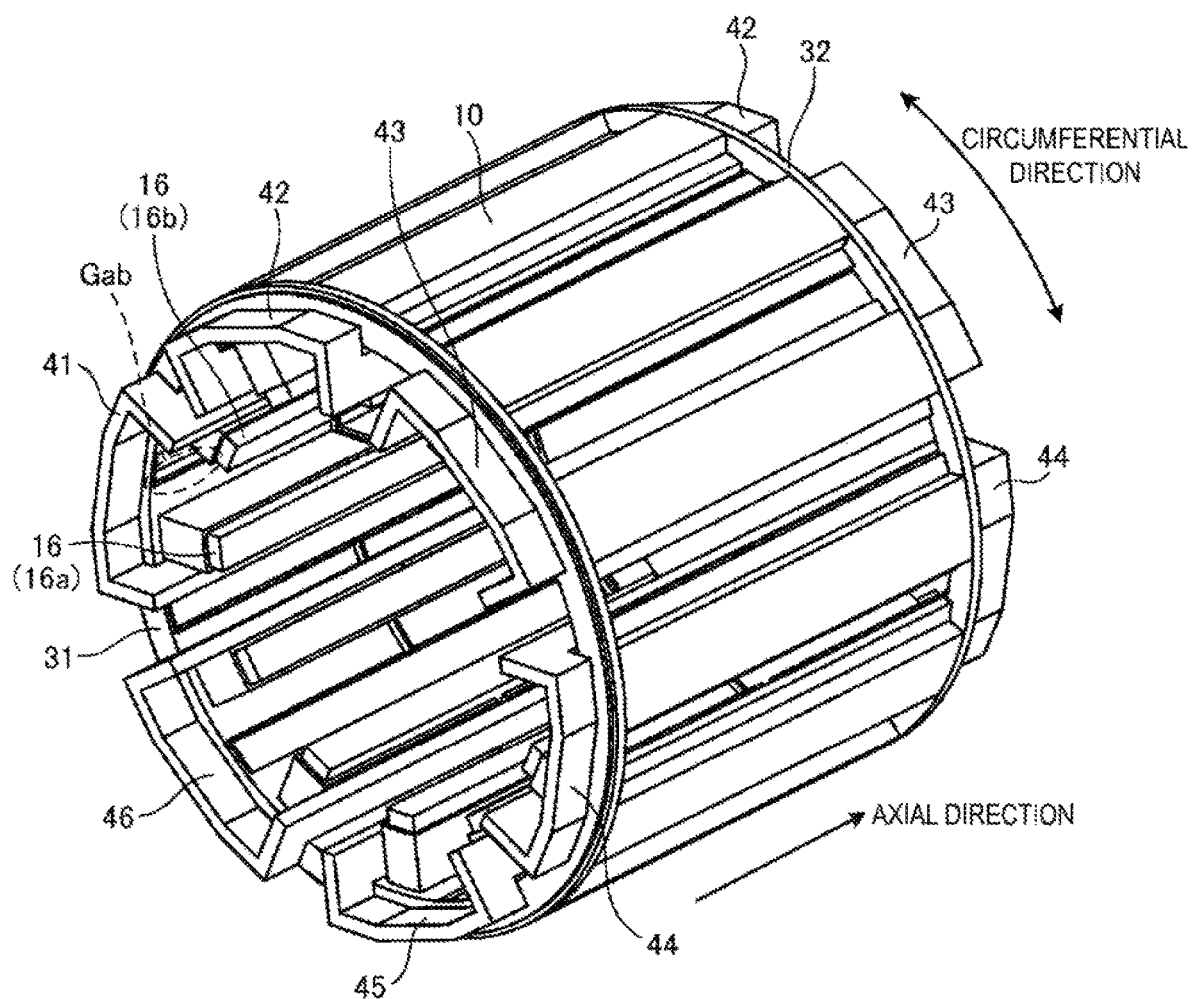
FIG. 8 is a perspective view illustrating an example of the first stator with the first coil attached according to an embodiment.

FIG. 7 is a perspective view illustrating an example of attaching the first coil to the first stator according to the embodiment. FIG. 8 is a perspective view illustrating an example of the first stator with the first coils attached according to the embodiment. As illustrated in FIG. 7 and FIG. 8, according to the embodiment, the first coil 40 is disposed close to the end face 18 at one side in the circumferential direction of the first magnetic pole unit 16 and the end face 17 at the other side in the circumferential direction of the other first magnetic pole unit 16 adjacent to the other side in the circumferential direction of the first magnetic pole unit 16. For example, as illustrated in FIG. 7, the first coil 41 is disposed close to an end face 18a of the first magnetic pole unit 16a, and an end face 17b of the adjacent other first magnetic pole unit 16b.

Figure 9:
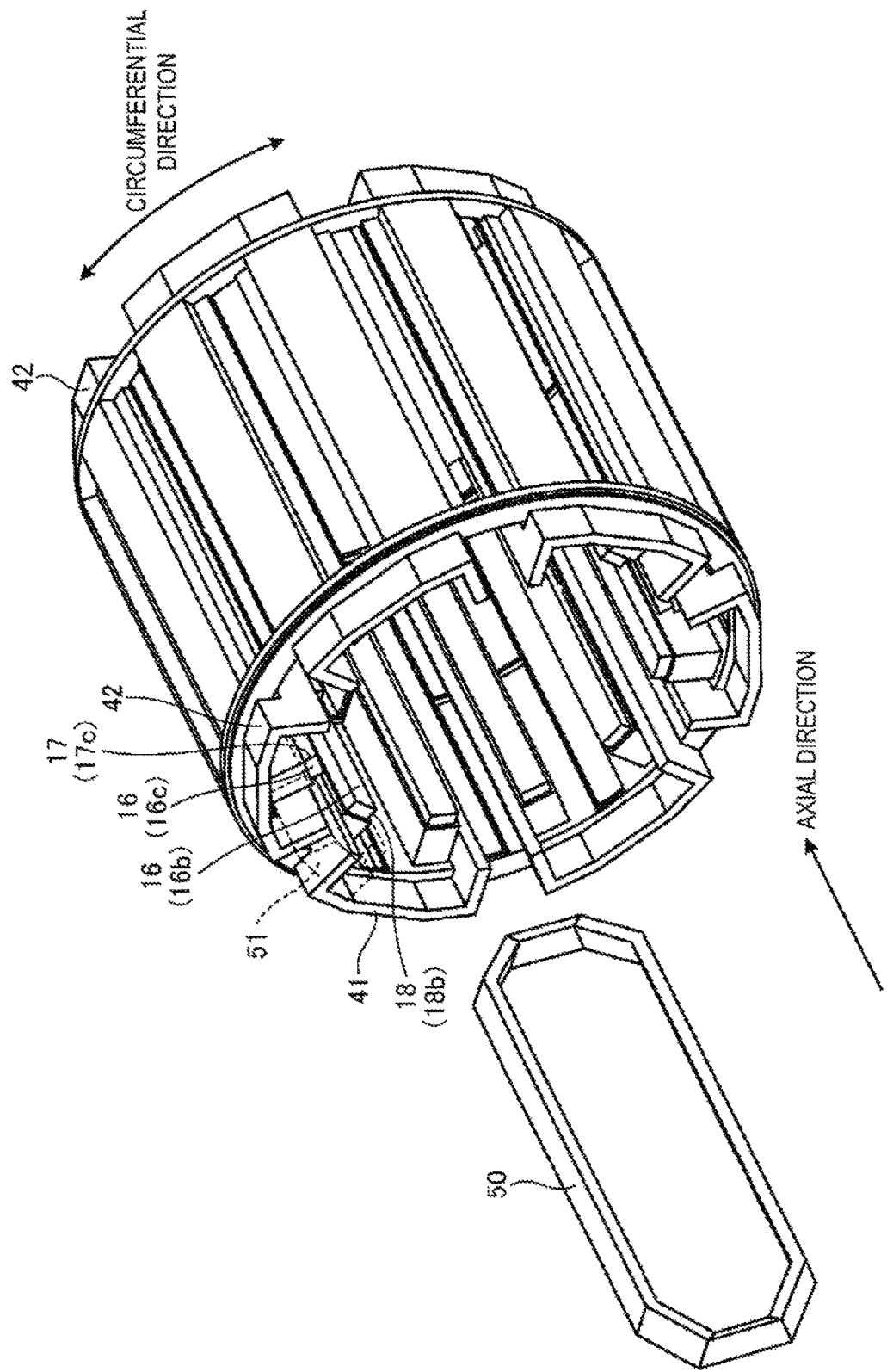
FIG. 9 is a perspective view illustrating an example of attaching a second coil to the first stator according to an embodiment.
Figure 10:
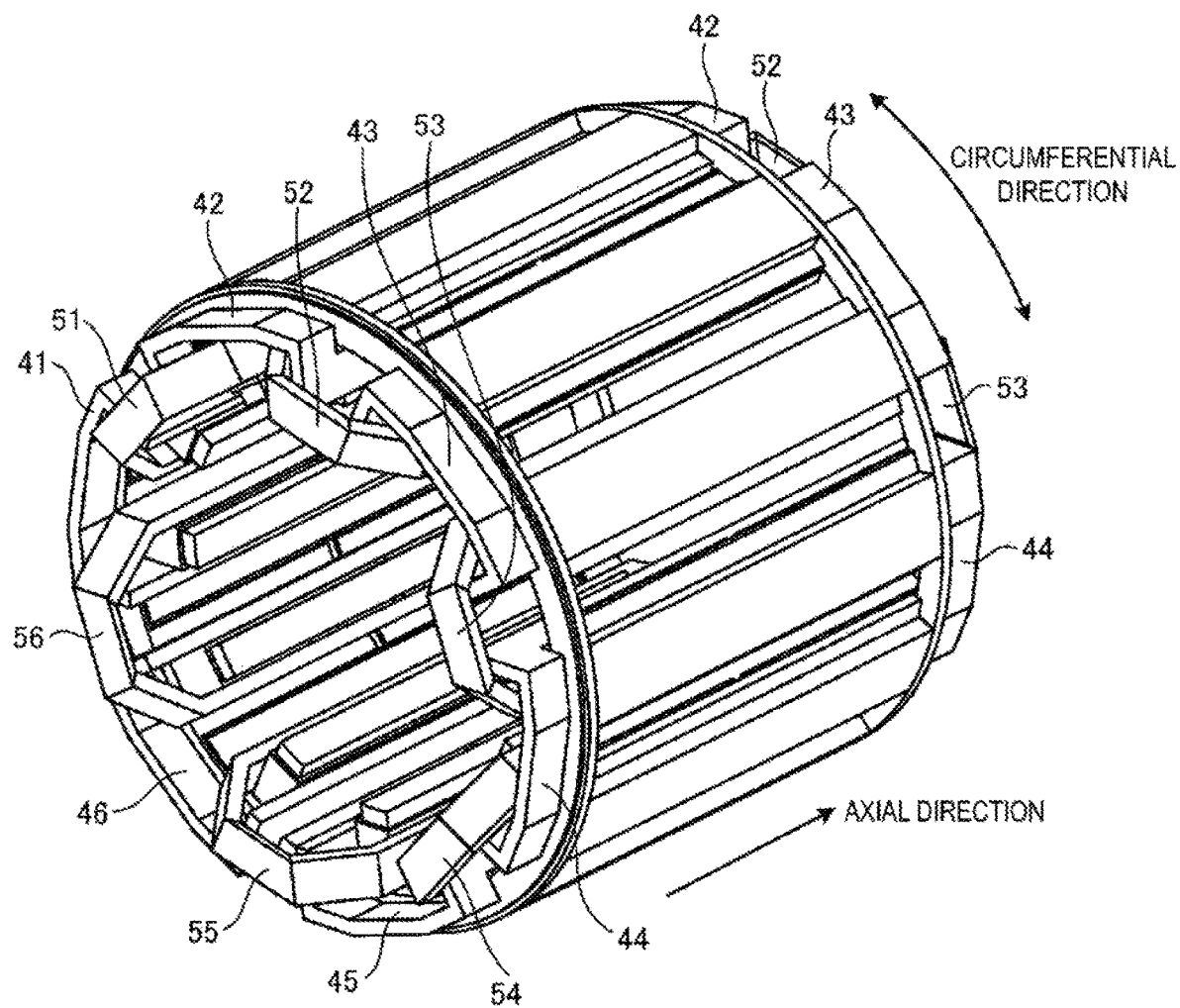
FIG. 10 is a perspective view illustrating an example of the first stator with the second coil attached according to an embodiment.
Figure 13:
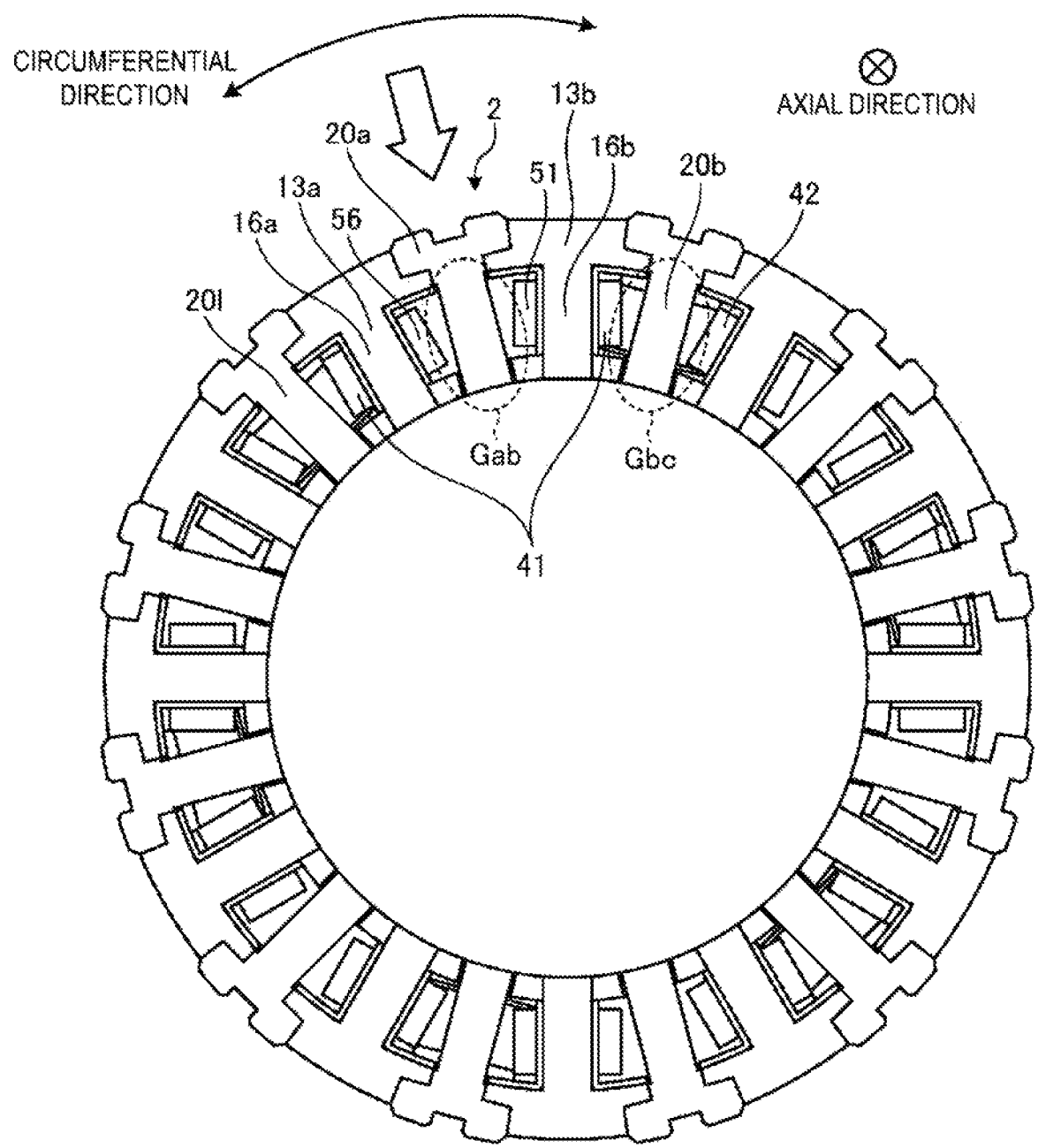
FIG. 13 is a cross-sectional view illustrating an example of a stator according to an embodiment.

Additionally, according to the embodiment, the second coil 50 is also disposed close to the end face 18 at one side in the circumferential direction of the first magnetic pole unit 16 and the end face 17 at the other side in the circumferential direction of the other first magnetic pole unit 16 adjacent to the other side in the circumferential direction of the first magnetic pole unit. FIG. 9 is a perspective view illustrating an example of attaching the second coil to the first stator according to the embodiment. FIG. 10 is a perspective view illustrating an example of the first stator with the second coils attached in the embodiment. For example, as illustrated in FIG. 13, the second coil 51 is close to the end face 18b of the first magnetic pole unit 16b and an end face 17c of the adjacent other first magnetic pole unit 16c.

In this case, as illustrated in FIGS. 9 and 10, the first magnetic pole unit 16 includes two end faces 17 and 18 in the circumferential direction. One of the two end faces 17 and 18 is close to the first coil 40 and the other is close to the second coil 50. For example, as illustrated in FIGS. 7 and 9, the second coil 51 is close to one end face 18b of the first magnetic pole unit 16b, and the first coil 41 is close to the other end face 17b of the first magnetic pole unit 16b.

Figure 11:
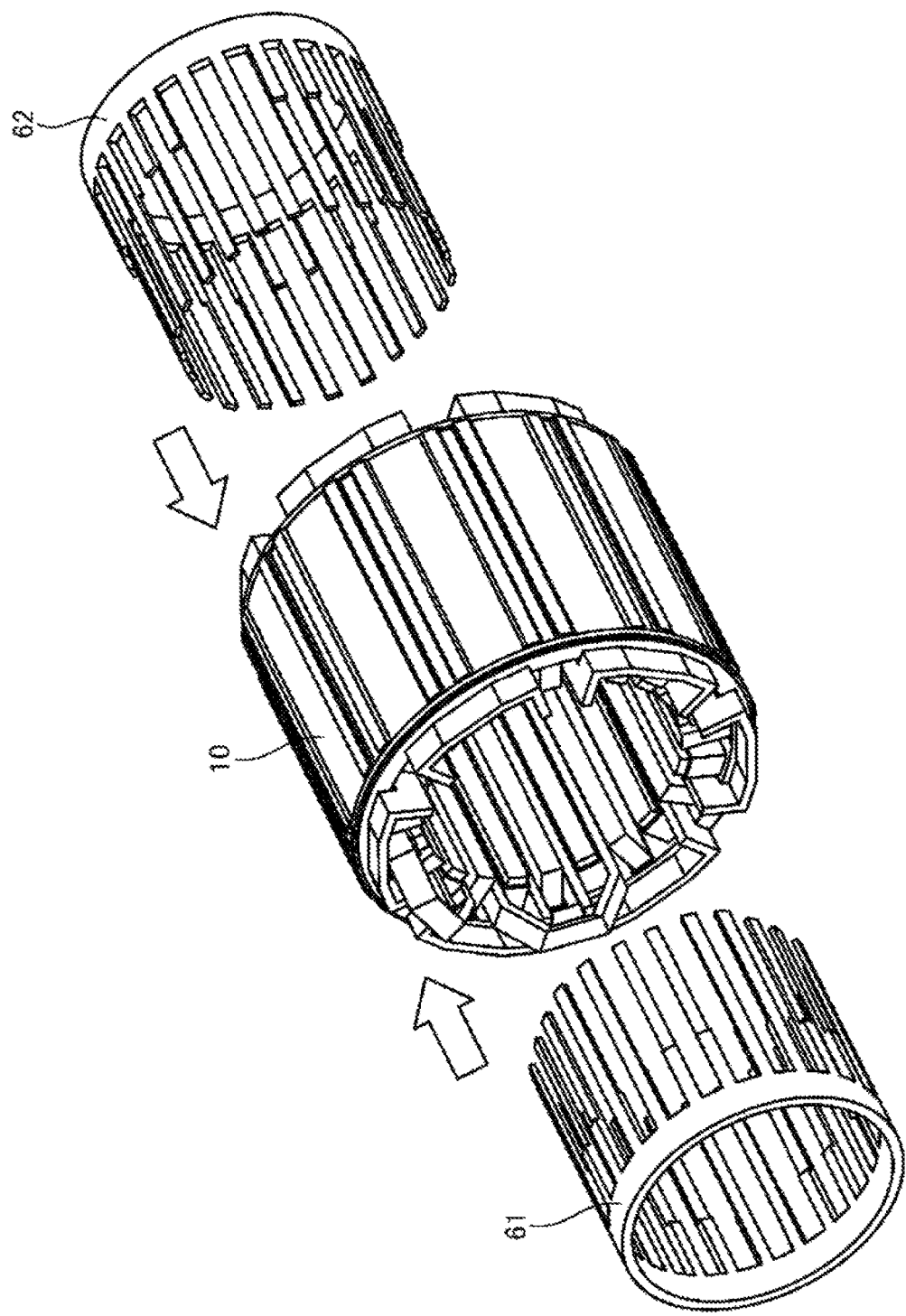
FIG. 11 is an exploded perspective view illustrating an example of the first stator and a stopper according to an embodiment.

As illustrated in FIG. 10, the first stator 10 is further mounted with a stopper to prevent the first coil 40 and the second coil 50, as bobbin coils, from falling off. FIG. 11 is an exploded perspective view illustrating an example of the first stator and the stoppers according to the embodiment. As illustrated in FIG. 11, the stopper 61 is mounted to the first stator 10 from the negative side in the axial direction. Similarly, the stopper 62 is mounted to the first stator 10 from the positive side in the axial direction. As illustrated in FIG. 11, according to the embodiment, the stopper 62 has approximately the same shape as the stopper 61.

Figure 12:
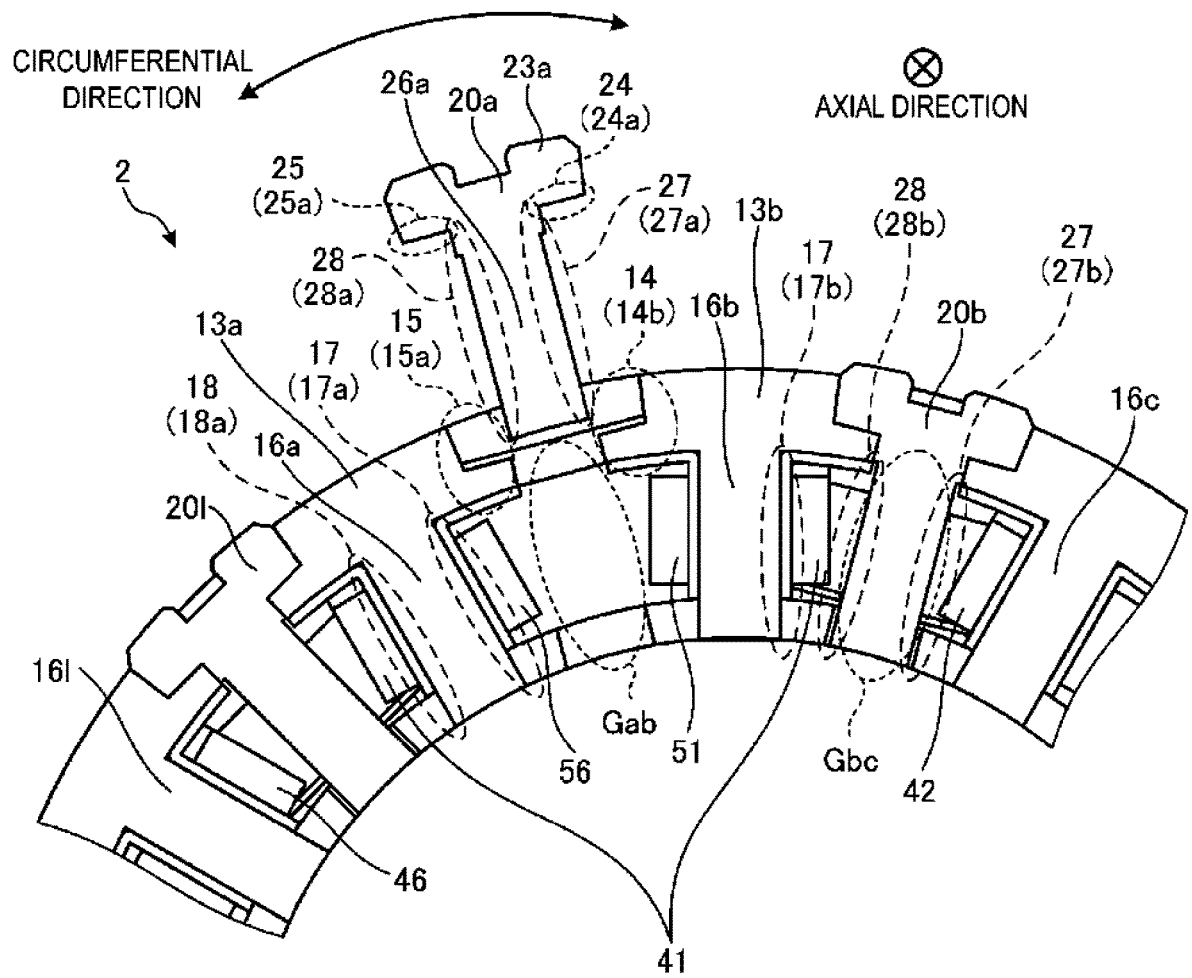
FIG. 12 is an enlarged cross-sectional view illustrating an example of attaching the second stator to the first stator according to an embodiment.

The first stator 10 with the stoppers 61 and 62 is further mounted with the second stator 20. FIG. 12 is an enlarged cross-sectional view illustrating an example of attaching the second stator to the first stator according to the embodiment. FIG. 13 is a cross-sectional view illustrating an example of the stator according to the embodiment. FIG. 12 illustrates a cross section cut at line B-B in FIG. 3. In FIG. 13, a cross section cut at line A-A in FIG. 2 is illustrated.

According to the embodiment, the second stator 20 includes a second yoke part 23 and a second magnetic pole unit 26. The second yoke part 23 is a member formed by, for example, layering electromagnetic steel plates in an axial direction. The second yoke part 23 includes two protrusions 24 and 25 protruding at both sides in the circumferential direction, respectively. The second magnetic pole unit 26 may be provided with such as an insulating film (not illustrated) or an insulating coating to cover the side. The insulating film is, for example, a thermal contraction film with insulating properties.

The second magnetic pole unit 26 is formed integrally with the second yoke part 23 and is a protrusion extending in a radial direction inward from the inner circumferential surface side of the second yoke part 23. As illustrated in FIGS. 3 and 12, the second magnetic pole unit 26 according to the embodiment also has a shape without an end part protruding in the circumferential direction, for example, at the tip side (inside in the radial direction).

According to the embodiment, the second stator 20 is disposed by the second magnetic pole unit 26 being press-fitted from the outside in the radial direction into the gap G formed between the two adjacent first magnetic pole units 16. For example, the second stator 20a illustrated in FIG. 12 is disposed at the gap Gab between the first magnetic pole unit 16a and the first magnetic pole unit 16b adjacent to the first magnetic pole unit 16a in the circumferential direction.

According to the embodiment, some gaps among the gaps G with the second stators 20 disposed are located between two adjacent first coils 40. For example, a second magnetic pole unit 26b of a second stator 20b illustrated in FIGS. 12 and 13 is disposed at a gap Gbc located between the first coil 41 and other first coil 42 adjacent to the first coil 41 in the circumferential direction.

In addition, according to the embodiment, other gaps among the gaps G with the second stators 20 disposed are located between two adjacent second coils 50. For example, a second magnetic pole unit 26a of the second stator 20a illustrated in FIGS. 12 and 13 is disposed at the gap Gab located between the second coil 56 and the other second coil 51 adjacent to the second coil 56 in the circumferential direction.

As described above, the motor 1 according to the embodiment includes the shaft 99, the rotor 90, the first stator 10, and the second stator 20. The first stator 10 includes the plurality of first yoke parts 13, the plurality of first magnetic pole units 16, the coupling parts 11 and 12 for coupling the plurality of first yoke parts 13 in a circumferential direction, and the gaps G formed between the plurality of first magnetic pole units 16 adjacent in a circumferential direction. The second stators 20 each include the second yoke part 23 and the second magnetic pole unit 26. The second stator 20 is disposed at the gap G. With such a configuration, distributed winding coils can be easily formed.

In addition, since the plurality of first yoke parts 13 according to the embodiment are coupled to the annular coupling parts 11 and 12, the misalignment of each first yoke part 13 is suppressed. This makes it possible to reduce circularity at the tip of the first magnetic pole unit 16 protruding inward in the radial direction of the stator 2.

Further, according to the embodiment, two mutually adjacent second stators 20 press-fitted into the gap G function as stoppers of the first magnetic pole unit 16 sandwiched between the two mutually adjacent second stators 20. For example, the first magnetic pole unit 16a illustrated in FIG. 13 pushes against each other with a second magnetic pole unit 26l press-fitted into the adjacent gap Gla. Similarly, the first magnetic pole unit 16a also pushes against each other with other second magnetic pole unit 26a press-fitted into the adjacent gap Gab.

Figure 14:
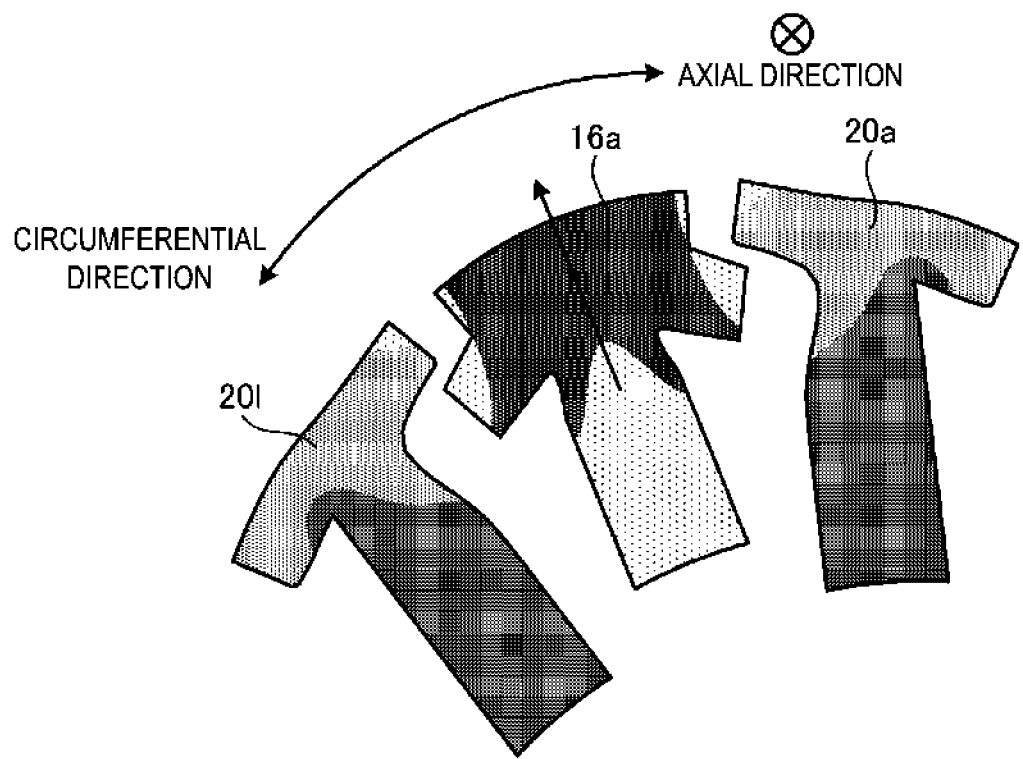
FIG. 14 is an enlarged cross-sectional view illustrating an example of the relationship between the first stator and the second stator according to an embodiment.

In such a configuration, for example, when a force to pull out in the direction illustrated by the arrow acts at the first magnetic pole unit 16a of the first stator 10, the first magnetic pole unit 16a and adjacent second stators 20l and 20a try to deform as illustrated in FIG. 14. FIG. 14 is an enlarged cross-sectional view illustrating an example of the relationship between the first stator and the second stator according to the embodiment. In this case, the two second stators 20l and 20a adjacent to the first magnetic pole unit 16a each restrain the first magnetic pole unit 16a from falling off in the direction indicated by the arrow. Thus, in the configuration according to the embodiment, the falling off of the first magnetic pole unit 16 can be suppressed. Since the second stators 20a and 20l are disposed in a motor frame (not illustrated), the first stator 10 and the second stator 20 can be held more firmly.

Figure 15:
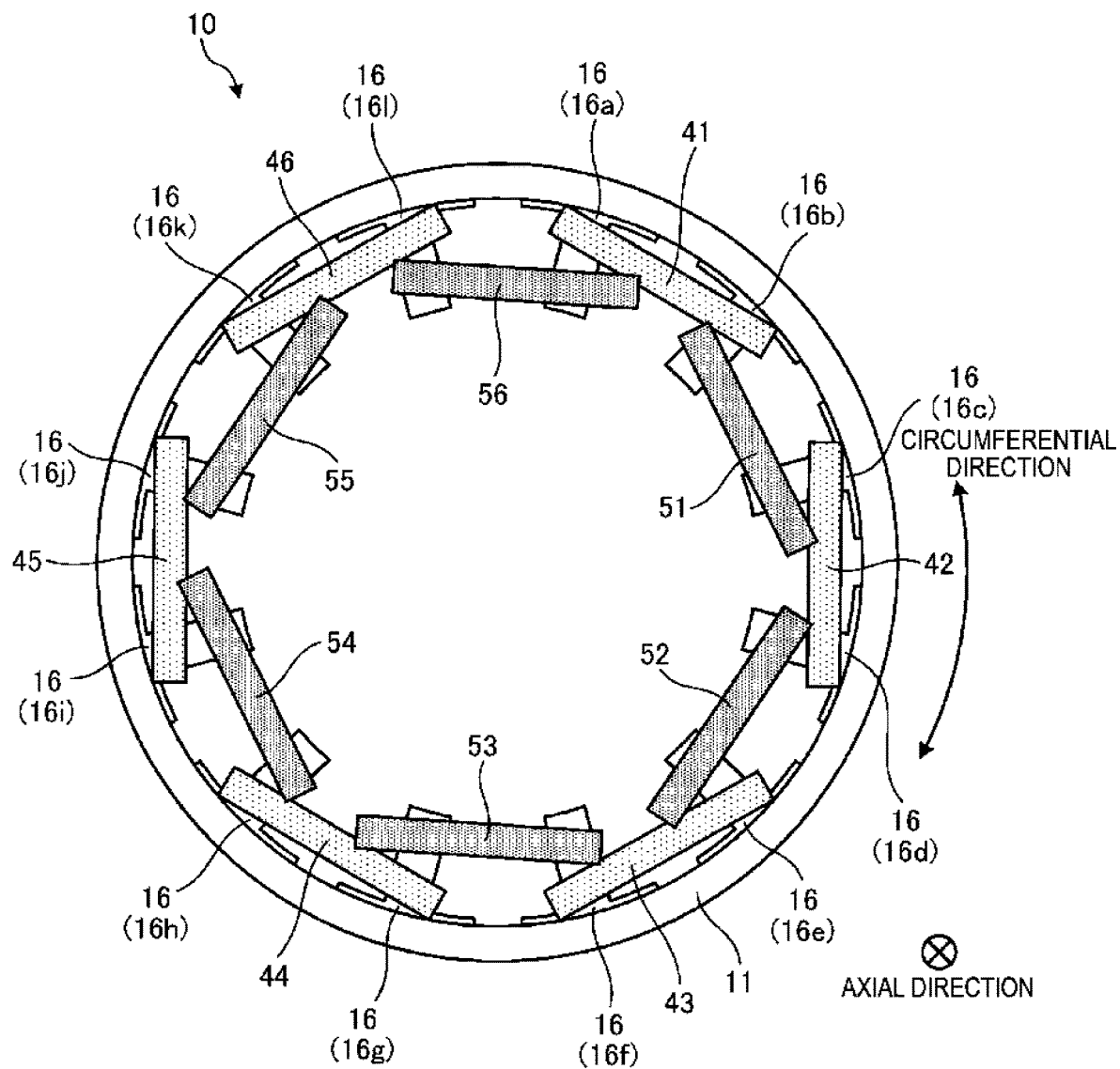
FIG. 15 is a schematic diagram illustrating an example of the arrangement of coils according to an embodiment.
Figure 16:
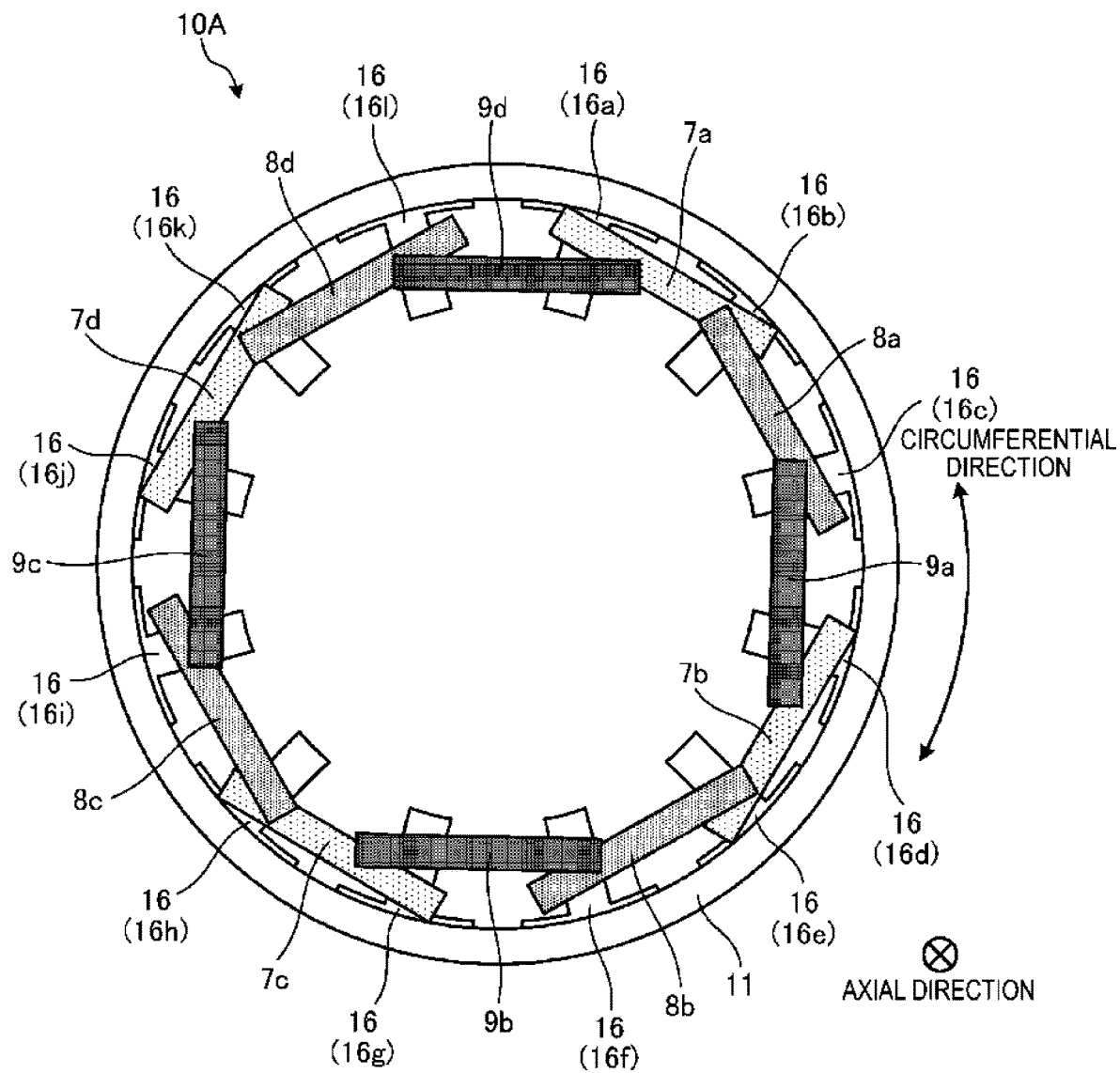
FIG. 16 is a schematic diagram illustrating an example of the arrangement of coils according to a first modification.

The configuration according to the embodiment has been described above, but embodiments are not limited to this embodiment. For example, although the configuration of disposing two layers of coils of the first coils 40 and the second coils 50 at the first stator 10 as illustrated in FIG. 15 has been described, a configuration of disposing three or more layers of coils may be adopted as illustrated in FIG. 16. FIG. 15 is a schematic diagram illustrating an example of disposing the coils according to the embodiment. FIG. 16 is a schematic diagram illustrating an example of disposing the coils according to the first modification. Note that, in the following embodiments and each of modifications, parts identical to those illustrated in the drawings described previously are designated by the same reference numerals, and duplicate descriptions will be omitted. In FIGS. 15 and 16, illustrations of the insulators 31 and 32 and other members are omitted.

As illustrated in FIG. 16, at a first stator 10A according to the first modification, at first, four first coils 7a to 7d are disposed, then four second coils 8a to 8d, and four third coils 9a to 9d are disposed in order, respectively.

In addition, the configuration of disposing each coil across two mutually adjacent first magnetic pole units has been described according to the embodiment and the first modification, but embodiments are not limited to this configuration. For example, the coils may be disposed across the two non-adjacent first magnetic pole units 16, or disposed at separate first magnetic pole units 16, respectively. Thus, the position of the first magnetic pole unit 16 with the coil disposed may be adjusted from the viewpoint of workability of the coil placement, or balance of the center of gravity of the stator, or the like. Even in this case, since the second stator 20 is mounted after the coil placement, workability during the coil placement can be improved.

Although an example of disposing the first coils 40 and the second coils 50, of bobbin coil-type has been described, the embodiments are not limited to the disposition. For example, the first coils 40 and the second coils 50 may be disposed by being wound by a nozzle or the like. In addition, the first magnetic pole unit 16 may be shaped to include, for example, two end parts protruding in the circumferential direction at the tip side (inside in the radial direction). It should be noted that a shape with two end parts protruding in the circumferential direction is advantageous when inserting members such as insulating members and sensors.

In addition, the second magnetic pole unit 26 may be disposed at the gap G by a method other than the press-fitting, for example, when there is no risk of the first magnetic pole unit 16 falling off. The coupling parts 11 and 12 may be provided either alone or at locations other than both end parts in the axial direction.

When there is no risk of the first coils 40 and the second coils 50 falling off, for example, in the case where the first coil 40 and the second coil 50 are bonded to the insulators 31 and 32, the configuration may not include the stoppers 61 and 62. In addition, instead of the insulators 31 and 32, an insulating member may be provided by a process of providing an insulating layer such as an insulating coating.

Figure 17:
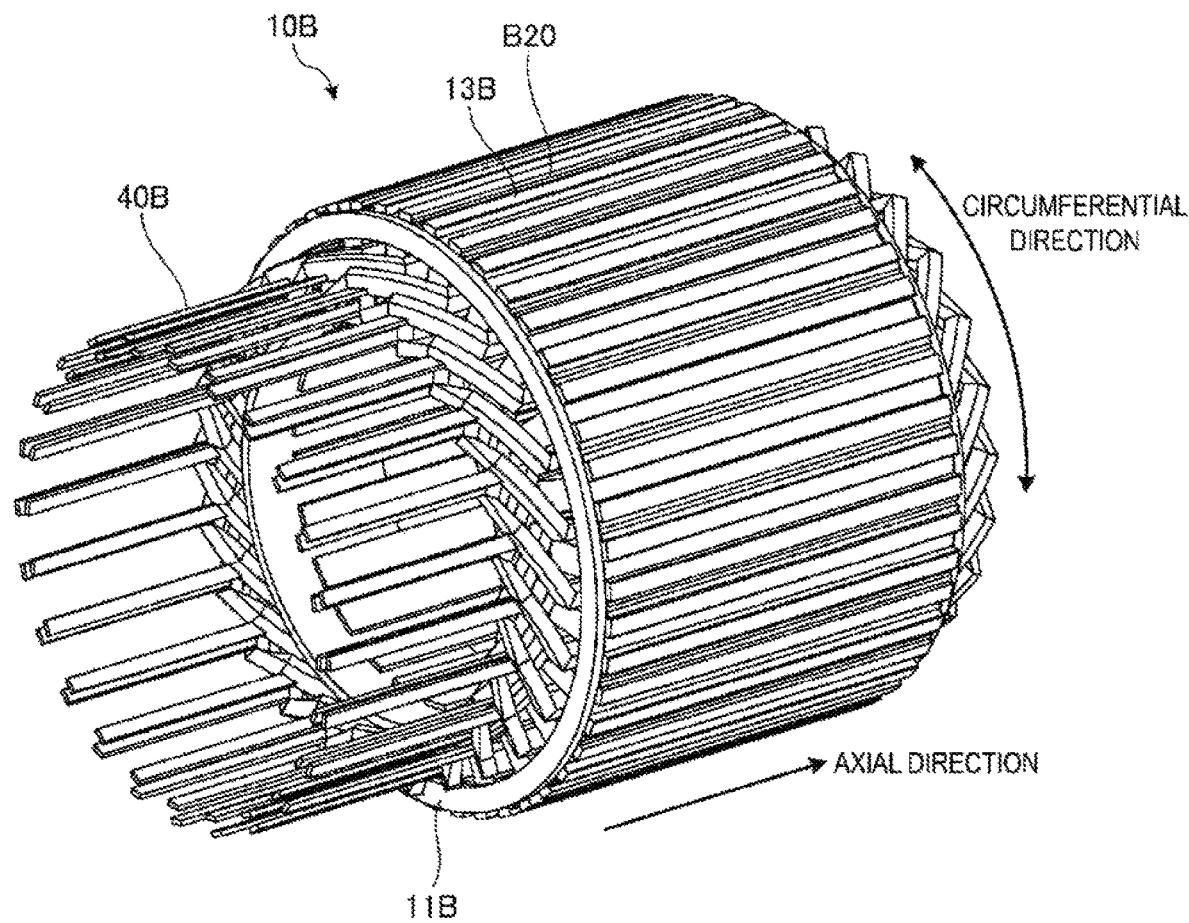
FIG. 17 is a perspective view illustrating an example of a stator according to a second modification.

In addition, a configuration of disposing bobbin coils by a plurality of groups has been described, but the embodiments are not limited to this configuration. For example, instead of a configuration of disposing the first coils 40 and the second coils 50 by a plurality of layers as illustrated in FIG. 17, conductors such as bobbin coils or conductor segments may be disposed in a row. FIG. 17 is a perspective view illustrating an example of a stator according to the second modification. As illustrated in FIG. 17, a plurality of first coils 40B are disposed in a row at a first stator 10B according to the second modification. In the following, a plurality of first coils 40B, when separately expressed, are sometimes described as first coils 40Ba to 40Bx, respectively.

Figure 18:
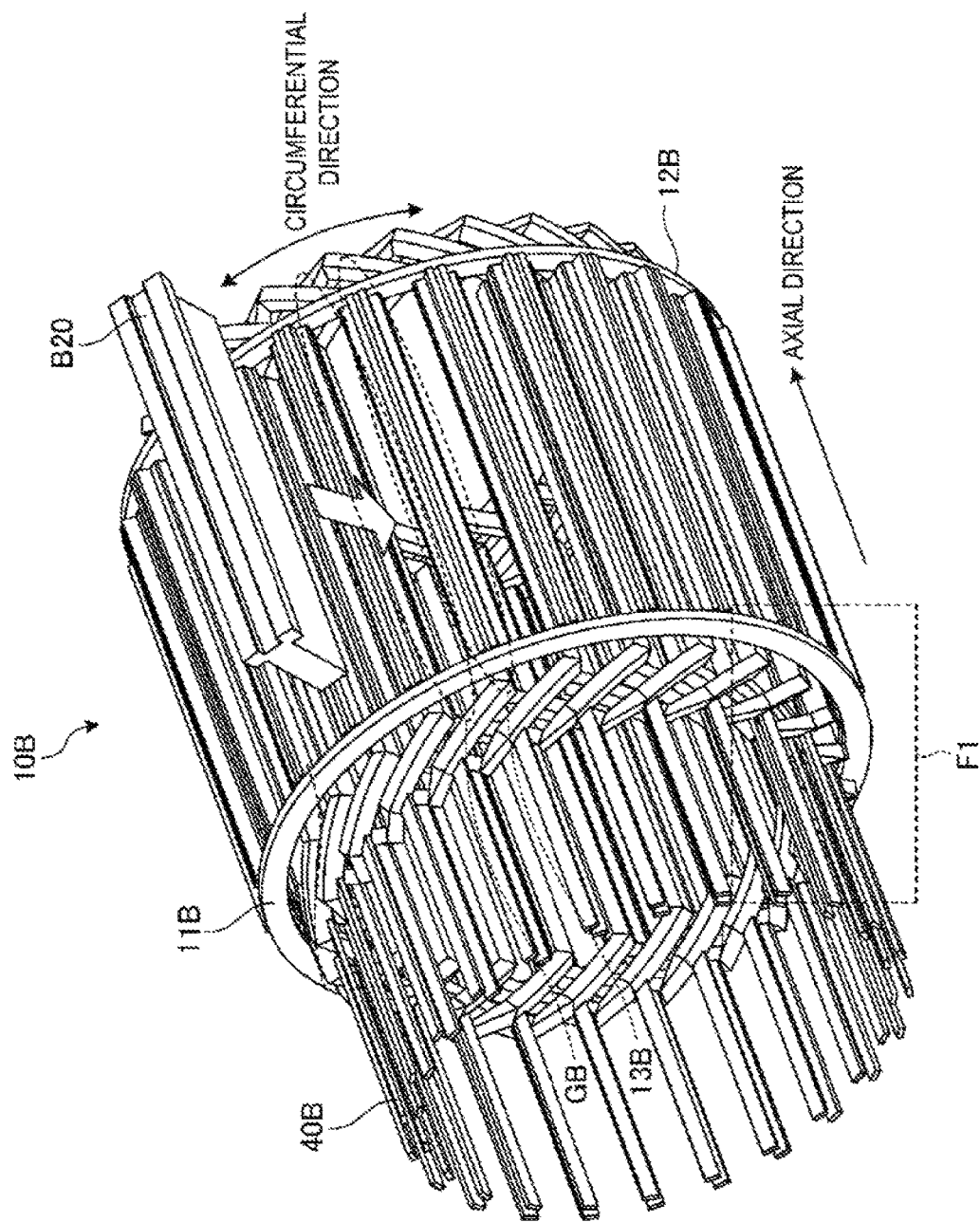
FIG. 18 is a perspective view illustrating an example of attaching a second stator according to the second modification.

According to the second modification, the first stator 10B includes coupling parts 11B and 12B and a first yoke part 13B. Further, the first coils 40B are disposed at the inner circumferential side of the first stator 10B, as described later. A second stator B20 is further mounted at the first stator 10B with the plurality of first coils 40B disposed, as illustrated in FIG. 18. FIG. 18 is a perspective view illustrating an example of attaching the second stator according to the second modification. As illustrated in FIG. 18, in the first yoke part 13B of the first stator 10B according to the second modification, no magnetic pole unit protruding in a radial direction inward is formed. The coupling parts 11B and 12B are provided at both axial ends of the first yoke part 13B to couple each first yoke part 13B in a circumferential direction. In addition, the first yoke parts 13B adjacent in the circumferential direction oppose each other sandwiching a gap GB. In the axial direction, the coupling part 11B is provided by a separate member and a coupling part 12B is provided at the other side in the axial direction integrally with the first yoke parts 13B. However, not limited to this configuration, coupling parts of separate members may be provided at both sides in the axial direction or coupling parts may be provided at both sides in the axial direction integrally with the first stator.

Figure 19:
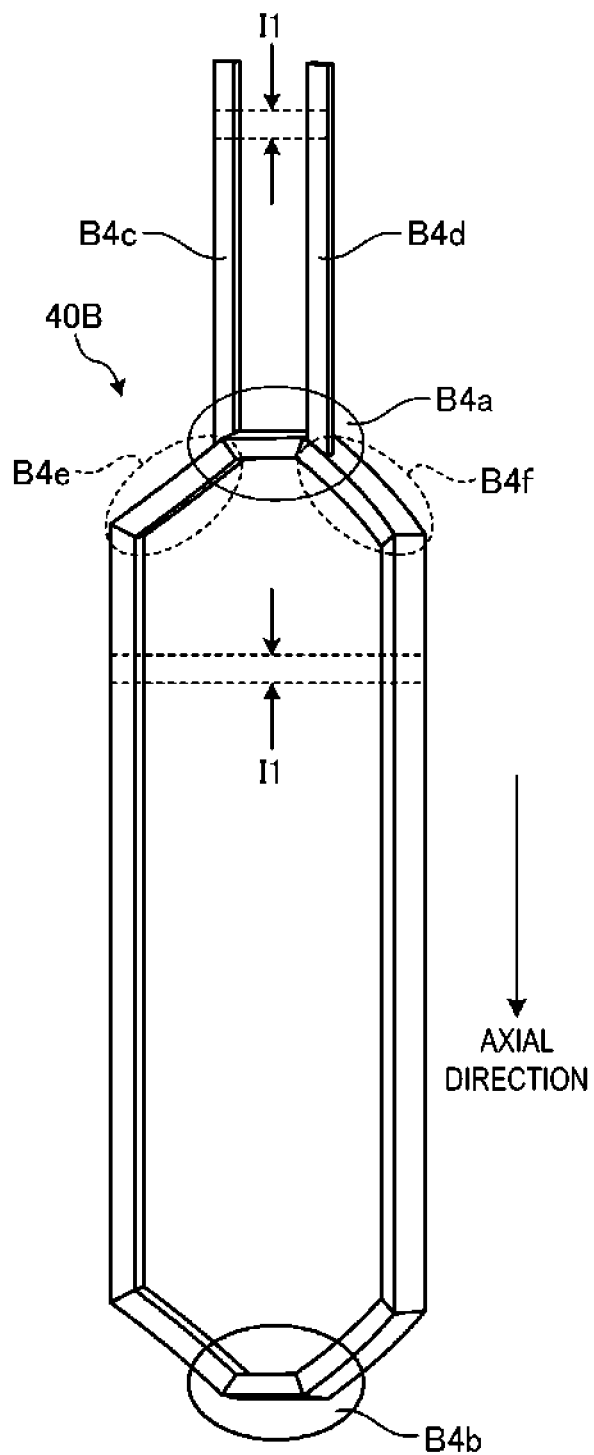
FIG. 19 is a top view of a first coil according to the second modification.

FIG. 19 is a top view of the first coil according to the second modification. As illustrated in FIG. 19, the first coil 40B according to the second modification is, for example, a hexagonally shaped bobbin coil. The first coil 40B is not limited to a bobbin coil formed in advance, but an electric conductor such as an unformed segment conductor may be used and mechanical work such as bending may be performed after the arrangement, or the like. The first coil 40B is an example of a conductor.

As illustrated in FIG. 19, the first coil 40B is formed including a pair of hypotenuses extending at one side in the axial direction and a pair of hypotenuses extending at the other side in the axial direction and a pair of sides extending in the axial direction, in other words, in a hexagonal shape including a first top B4a convex at one side in the axial direction and a second top B4b convex at the other side.

Each first coil includes, for example, two connecting parts B4c and B4d protruding in the axial direction as illustrated in FIG. 19. The connecting parts of other first coil 40B disposed adjacent to each other are connected by welding, for example. Besides welding, electrical connection by ultrasonic welding, or mechanical connection process by caulking, may be performed.

Figure 20:
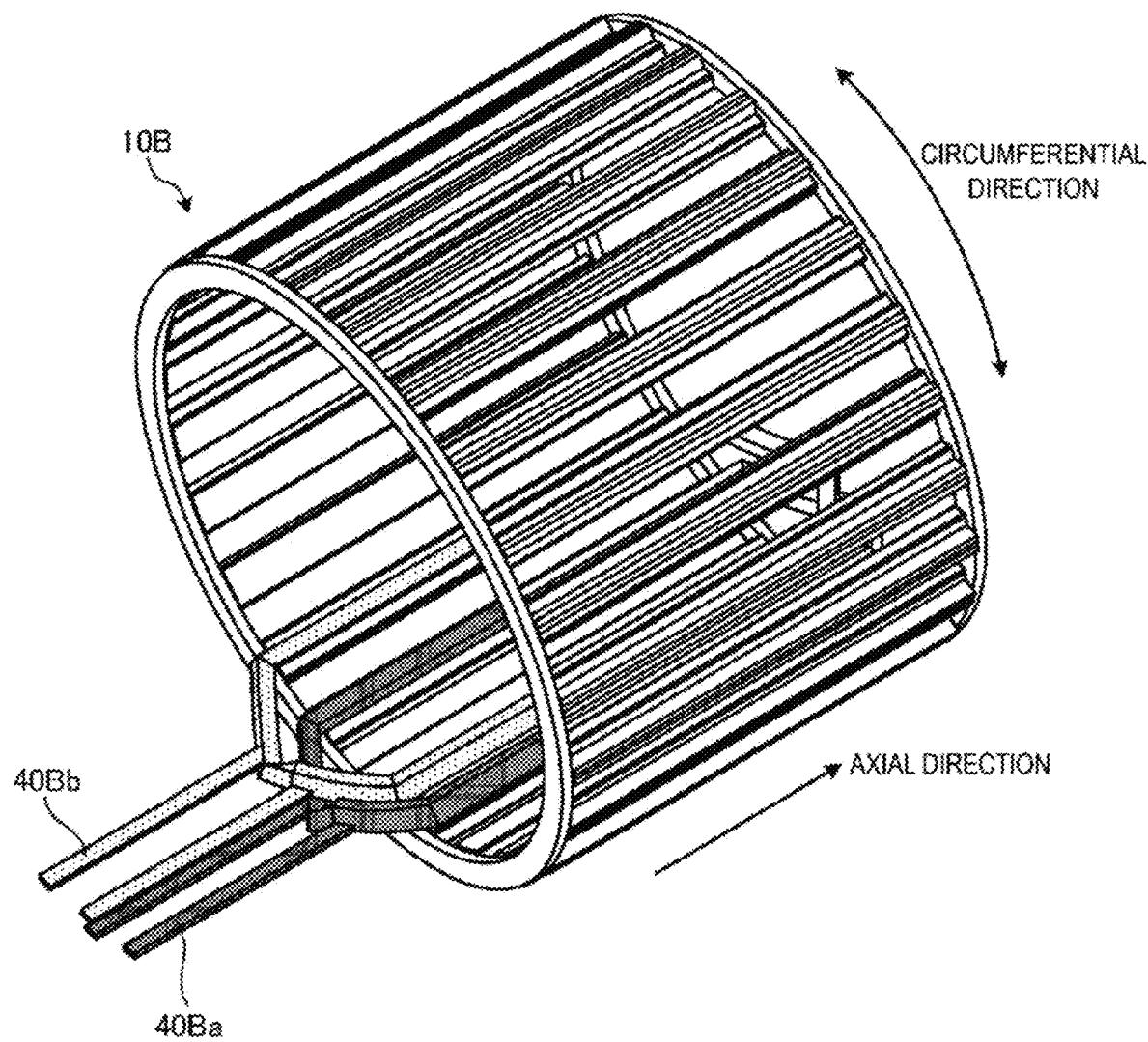
FIG. 20 is a perspective view illustrating an example of a first coil disposed at a first stator according to the second modification.
Figure 21:
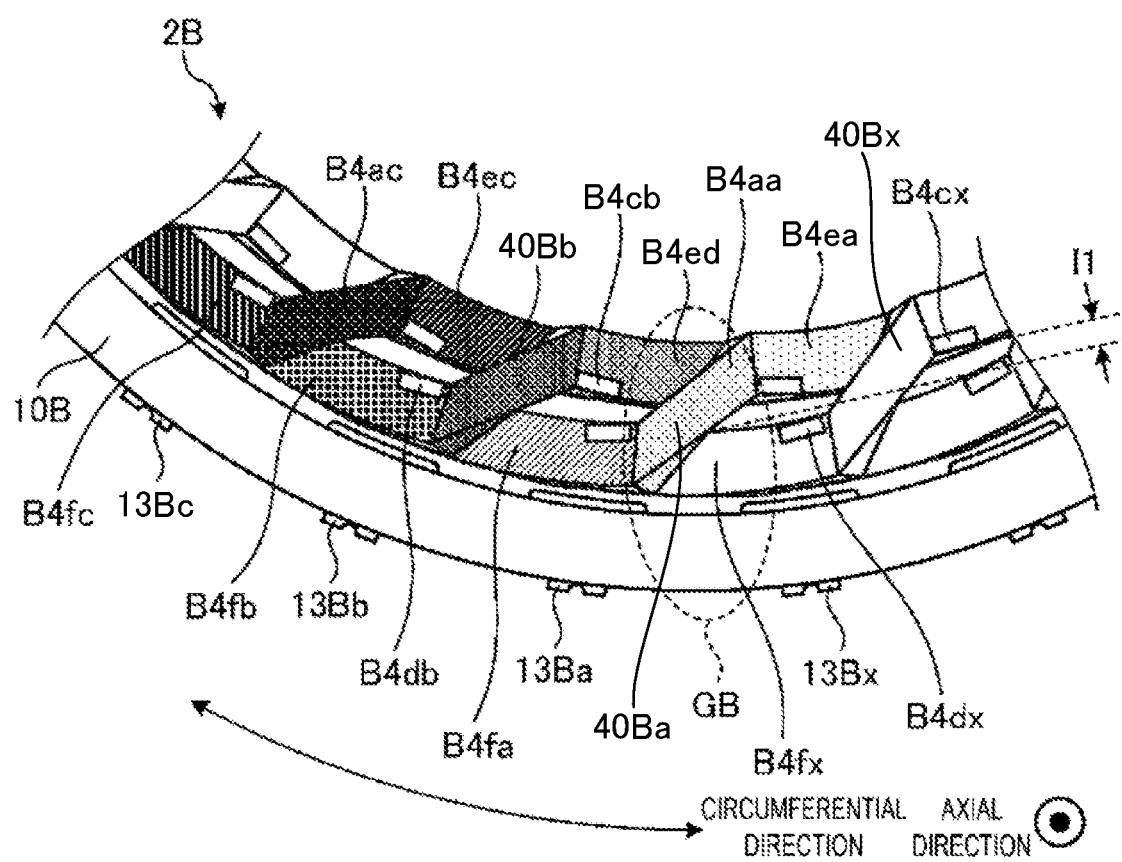
FIG. 21 is a side view illustrating an example of the first coil at the first stator according to the second modification.

Further, the first coil 40B includes a shape having a step I1 in the radial direction. For example, the first top B4a and the second top B4b form slopes changing the position in the radial direction from a connecting part B4d to a connecting part B4c. In this case, as illustrated in FIGS. 20 and 21, a hypothenuse B4ea, one of a pair of hypothenuses extending at one side in the axial direction of a first coil 40Ba disposed earlier, is disposed at the other side in the axial direction of the hypothenuse B4eb, one of the pair of hypothenuses extending at the one side in the axial direction of a first coil 40Bb disposed later. FIG. 20 is a perspective view illustrating an example of the first coil disposed at the first stator according to the second modification. FIG. 21 is a side view illustrating an example of the first coils disposed at the first stator according to the second modification. FIG. 21 is an enlarged view of a portion illustrated at frame F1 of FIG. 18.

Furthermore, a hypotenuse B4fb, the other of the pair of hypotenuses extending at the one side in the axial direction of the first coil 40Bb inserted later, is disposed at the one side in the axial direction of a hypotenuse B4fa, the other of the pair of hypotenuses extending at the one side in the axial direction of the first coil 40Ba inserted earlier. At this time, the hypotenuses B4ea and B4eb, each being one of the pair of hypotenuses extending at one side in the axial direction, are disposed in a radial direction more inward than hypotenuse B4fa and B4fb, each being the other of the pair of hypotenuses extending at one side in the axial direction. Additionally, as illustrated in FIG. 21, the hypotenuse B4ea of the first coil 40Ba and the hypotenuse B4xb of the first coil 40X, adjacent to the first coil 40Ba in a circumferential direction, oppose each other separated in a radial direction by an interval I1.

As illustrated in FIG. 21, the plurality of first coils 40B are disposed at the inner circumferential side of the first stator 10B, and thus the first top B4a opposes the gap GB in a radial direction. In this case, at each of the gaps GB, as illustrated in FIG. 18, a plurality of second stators B20 are inserted by press-fitting from outside in a radial direction and disposed. When the second stator B20 is inserted, for example, by holding the connecting parts B4c and B4d of the plurality of first coils 40B disposed at the first stator 10B by the machine, the position of the first coil 40B is fixed so as to correspond to the gap GB in the circumferential direction as illustrated in FIG. 21.

Figure 22:
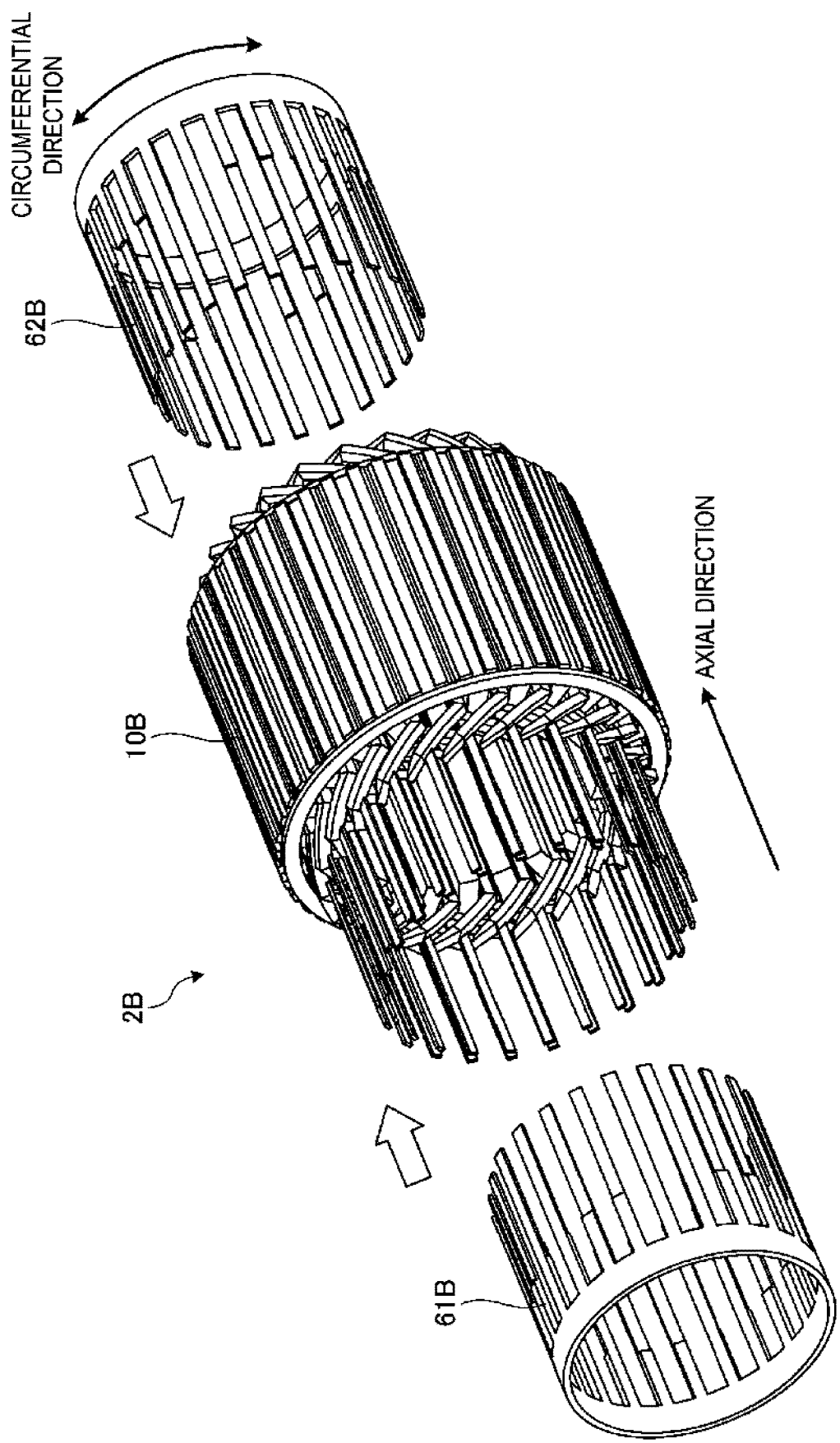
FIG. 22 is an exploded perspective view illustrating an example of the first stator and a stopper according to the second modification.

The second stator B20 press-fitted into the gap GB is adjacent to the first coil 40B in the circumferential direction as illustrated in FIGS. 17 and 18. In addition, stoppers 61B and 62B for preventing the first coil 40B from falling off in the radial direction may be further disposed at the first stator 10B with a plurality of second stators B20 press-fitted from both sides in the axial direction, as illustrated in FIG. 22. FIG. 22 is an exploded perspective view illustrating an example of the first stator and the stoppers according to the second modification. The second stator B20 includes an insulating film (not illustrated) covering the sides. The insulating film is, for example, a thermal contraction film with insulating properties.

In this way, the space factor of the motor 1 can be improved by using conductors such as conductor segments, and the fabrication of the motor 1 can be facilitated and circularity of the inside diameter can be enhanced by disposing the second stator at the gap of the first stator.

The motor according to the embodiment is, for example, an inner rotor-type brushless motor, but not limited to this motor, and at the outer rotor-type motor, the first stator and the second stator according to the embodiment or the modifications may be adopted. The first stator and the second stator may be adopted in a rotary electric machine other than a motor, such as a generator.

Although the present invention has been described above based on the embodiment and each modification, the present invention is not limited to the embodiment and each modification. It goes without saying that various modifications are possible without departing from the gist of the present invention. Various modifications that do not depart from such a gist are also included in the technical scope of the present invention, and this is apparent to those skilled in the art from the description of the claims.

REFERENCE SIGNS LIST

1 Motor, 2 Stator, 10, 10A, 10B First stator, 11, 12 Coupling part, 13 (13a to 13l) First yoke part, 16 (16a to 16l) First magnetic pole unit (teeth), 31, 32 Insulator, 20 (20a to 20l) Second stator, 23 Second yoke part, 26 (26a to 26l) Second magnetic pole unit (Teeth), 40 (41 to 46), 7a to 7d First coil, 50 (51 to 56), 8a to 8d Second coil, 9a to 9d Third coil, 90 Rotor, 99 Shaft

The invention claimed is:
1. A motor comprising:
a shaft;
a rotor;
a first stator; and
a second stator,
wherein the first stator includes:
a plurality of first yoke parts, wherein the plurality of first yoke parts each include a recessed part recessed in a circumferential direction,
a plurality of first magnetic pole units,
a coupling part configured to couple the plurality of first yoke parts in a circumferential direction, and
a gap formed between the plurality of first magnetic pole units adjacent in a circumferential direction,
wherein the second stator includes:
a second yoke part,
a second magnetic pole unit, and
a protrusion protruding in a circumferential direction,
wherein the recessed part and the protrusion are engaged, and
wherein the second stator is disposed at the gap.
2. The motor according to claim 1, wherein the coupling part is disposed at each of ends of the plurality of first yoke parts in the axial direction.
3. A motor comprising:
a shaft;
a rotor;
a first stator;
a second stator;
an insulating member; and a first coil disposed at the plurality of first magnetic pole units via the insulating member, wherein the first stator includes:
   a plurality of first yoke parts,
   a plurality of first magnetic pole units,
   a coupling part configured to couple the plurality of first yoke parts in a circumferential direction, and
   a gap formed between the plurality of first magnetic pole units adjacent in a circumferential direction, wherein the second stator includes:
   a second yoke part, and
   a second magnetic pole unit, wherein the second stator is disposed at the gap, and wherein the first coil is disposed across an end face at one side of one of the plurality of first magnetic pole units in the circumferential direction and an end face at the other side of the other first magnetic pole unit adjacent to the other side of the one of the plurality of first magnetic pole units in the circumferential direction.

4. The motor according to claim 3, comprising a second coil disposed at the plurality of first magnetic pole units via the insulating member, wherein the second coil is disposed at an end face opposite, in a circumferential direction, to the end face of any of the plurality of first magnetic pole units with the first coil disposed.

5. The motor according to claim 4, wherein any of a plurality of the second magnetic pole units is disposed at a gap between the second coil and other second coil adjacent in a circumferential direction to the second coil.

6. The motor according to claim 3, wherein at least one of a plurality of the second magnetic pole units is disposed at a gap between the first coil and the other first coil adjacent in a circumferential direction to the first coil.

* * * * *